(12) United States Patent
Balasubramanian et al.

(10) Patent No.: US 9,985,857 B2
(45) Date of Patent: May 29, 2018

(54) NETWORK-BASED EARLY PACKET LOSS DETECTION

(71) Applicant: VID SCALE, INC., Wilmington, DE (US)

(72) Inventors: Anantharaman Balasubramanian, San Diego, CA (US); Liangping Ma, San Diego, CA (US); Gregory S. Sternberg, Mt. Laurel, NJ (US); Louis Kerofsky, San Diego, CA (US); Ralph Neff, San Diego, CA (US)

(73) Assignee: VID SCALE, INC., Wilmington, DE (US)

( * ) Notice: Subject to any disclaimer, the term of this patent is extended or adjusted under 35 U.S.C. 154(b) by 0 days. days.

(21) Appl. No.: 15/301,806

(22) PCT Filed: Apr. 3, 2015

(86) PCT No.: PCT/US2015/024257
§ 371 (c)(1),
(2) Date: Oct. 4, 2016

(87) PCT Pub. No.: WO2015/153977
PCT Pub. Date: Oct. 8, 2015

(65) Prior Publication Data
US 2017/0187593 A1    Jun. 29, 2017

Related U.S. Application Data

(60) Provisional application No. 61/975,425, filed on Apr. 4, 2014.

(51) Int. Cl.
*H04L 12/26*    (2006.01)
*H04L 29/06*    (2006.01)
*H04N 7/15*    (2006.01)

(52) U.S. Cl.
CPC ........ *H04L 43/0829* (2013.01); *H04L 65/403* (2013.01); *H04L 65/608* (2013.01); *H04L 65/80* (2013.01); *H04N 7/152* (2013.01)

(58) Field of Classification Search
None
See application file for complete search history.

(56) References Cited

U.S. PATENT DOCUMENTS

2005/0089104 A1*  4/2005  Kim ................. H04N 19/70
                                                375/240.27
2007/0204196 A1*  8/2007  Watson ............. H04L 1/1607
                                                714/751

(Continued)

FOREIGN PATENT DOCUMENTS

WO    WO 2013/126284 A2    8/2013

OTHER PUBLICATIONS

Perkins, Colin, "On the Use of RTP Control Protocol (RTCP) Feedback for Unicast Multimedia Congestion Control", University of Glasgow, IETF, Feb. 18, 2013, 8 pages.

(Continued)

*Primary Examiner* — Creighton Smith
(74) *Attorney, Agent, or Firm* — Condo Roccia Koptiw LLP

(57) ABSTRACT

A packet loss notification in a video transmission may be performed by a network device. The network device may receive a first video packet sent from a first client to a second client. The network device may determine that the first video packet has been lost. The network device may determine a video packet receiving port number of the first client. The network device may receive a second video packet sent from the second client to the first client. The network device may determine that the second video packet includes a destination port number that matches a video packet receiving port number of the first client. The network device may modify the second video packet by adding packet loss information indicating that the first video packet has been lost. The network device may send the modified second video packet to the first client.

30 Claims, 22 Drawing Sheets

(56) References Cited

U.S. PATENT DOCUMENTS

| | | | |
|---|---|---|---|
| 2010/0329126 A1 | 12/2010 | Van Gassel et al. | |
| 2015/0071272 A1* | 3/2015 | Vermani | H04B 7/0452 370/338 |
| 2015/0223105 A1* | 8/2015 | Leblanc | H04W 28/0242 370/230.1 |
| 2017/0156104 A1* | 6/2017 | Grandhi | H04W 48/10 |

OTHER PUBLICATIONS

Babiarz et al., "Configuration Guidelines for DiffServ Service Classes", Network Working Group, Request for Comments: 4594, Category: Informational, Aug. 2006, pp. 1-57.

Information Sciences Institute, "Internet Protocol", Darpa Internet Program, Protocol Specification, RFC: 791, Sep. 1981, 50 pages.

Malis et al., "Internet Protocol Version 4 (IPv4) Parameters", IP Option Numbers Assignment, Available on Internet https://www.iana.org/assignments/ip-parameters/ip-parameters.xhtml, Feb. 24, 2016, 4 pages.

Ramakrishnan et al., "The Addition of Explicit Congestion Notification (ECN) to IP", Network Working Group, Request for Comments: 3168, Category: Standards Track, Sep. 2001, pp. 1-63.

Schulzrinne et al., "RTP: A Transport Protocol for Real-Time Applications", Network Working Group, Request for Comments: 3550, Category: Standards Track, Jul. 2003, pp. 1-89.

Westerlund et al., "Explicit Congestion Notification (ECN) for RTP over UDP", Internet Engineering Task Force (IETF), Request for Comments: 6679, Category: Standards Track, Aug. 2012, pp. 1-58.

* cited by examiner

NETWORK-BASED EARLY PACKET LOSS DETECTION

CROSS REFERENCE TO RELATED APPLICATIONS

This application is the National Stage Entry under 35 U.S.C. § 371 of Patent Cooperation Treaty Application No. PCT/US2015/024257, filed Apr. 3, 2015, which claims the benefit of U.S. Provisional Patent Application No. 61/975,425, filed Apr. 4, 2014, the contents of which are hereby incorporated by reference herein.

BACKGROUND

Mobile multimedia traffic may be sent and received via smart phones and tablets, and may include video and/or audio streaming, high resolution display video, video conferencing, gaming, and/or the like. Real-time video applications may impose challenging requirements on wireless networks. Transmission errors may result in degraded video quality. An IP packet may be lost for a variety of reasons. Allowing errors to be identified, and potentially corrected, sooner, may result in improved quality.

A spoofing approach may be used to limit error propagation. However, encryption technology presents a major practical hurdle to adoption of a spoofing approach. For example, if a video sender expects an encrypted packet (for example, a negative acknowledgement (NACK) packet, or a real-time transport protocol (RTP) Control Protocol (RTCP) packet), the node that performs the spoofing must be aware of the encryption key, so that the video sender may process the received spoofed packet.

SUMMARY

Systems, methods, and instrumentalities are provided for early packet loss detection (EPLD) and notification in a network. The method may include packet loss notification in a video transmission. The video transmission may include a video call between a first client and a second client. A client may be a wireless transmit/receive unit such as a smart phone handset, a tablet computer, and/or the like. The video transmission may include a video conference having a plurality of clients. A network device may receive a first video packet sent from a first client to a second client. The network device may be a router, an access point, an eNodeB, a small cell (e.g., a home eNodeB), and/or the like. The network device may determine that the first video packet has been lost. For example, the network device may drop the first video packet. The network device may determine a video packet receiving port number of the first client. The video packet receiving port number of the first client may be determined based on an indication in the first video packet. The video packet receiving port number of the first client may be determined based on an indication in at least one of an internet protocol (IP) options field or a real-time transport protocol (RTP) extension header of the first video packet.

The network device may receive a second video packet sent from the second client to the first client. The network device may determine that the second video packet includes a destination port number that matches a video packet receiving port number of the first client. The network device may modify the second video packet by adding packet loss information indicating that the first video packet has been lost. The packet loss information may include a RTP sequence number of the first video packet. The network device may add the packet loss information to an IP options field or a RTP extension header of the second video packet. The network device may send the modified second video packet to the first client.

DETAILED DESCRIPTION

A detailed description of illustrative embodiments will now be described with reference to the various figures.

Although this description provides a detailed example of possible implementations, it should be noted that the details are intended to be exemplary and in no way limit the scope of the application. The order of the messages may be varied where appropriate. Messages may be omitted if not needed, and, additional messages may be added.

Figure 1A:
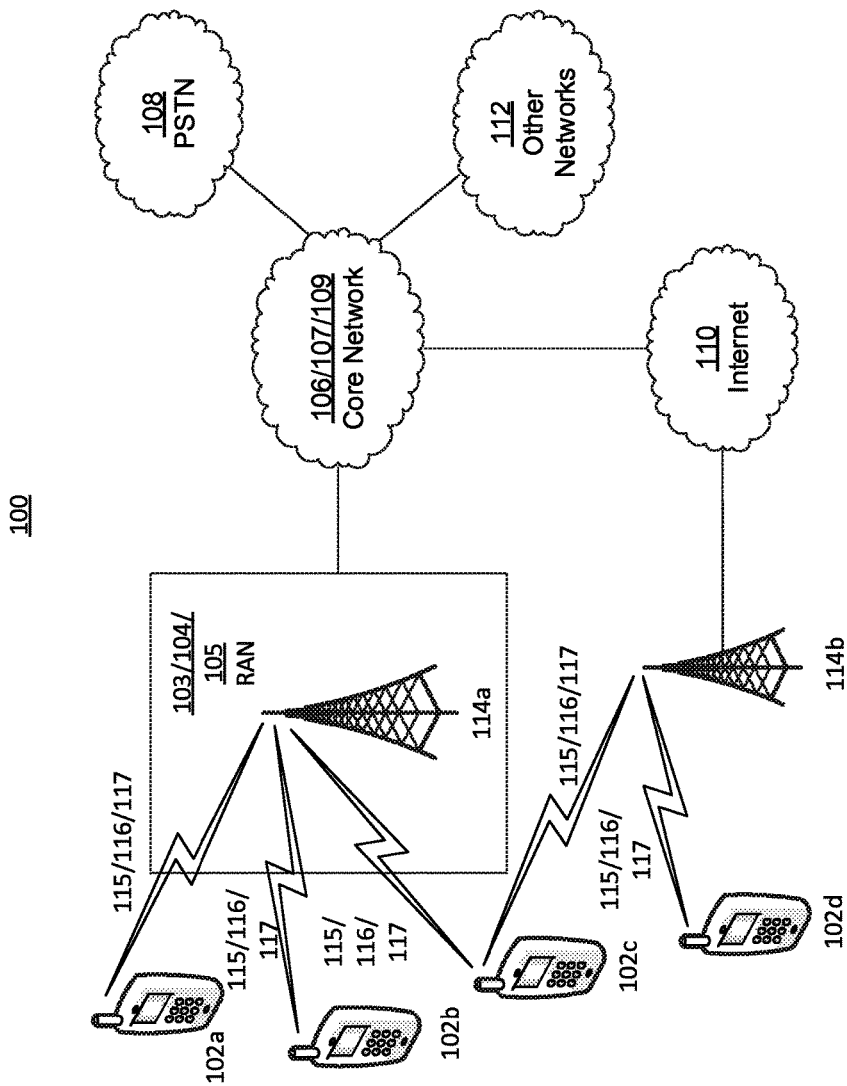
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. A WTRU and user equipment (UE) may be interchangeably used herein. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In an embodiment, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, and/or perform high-level security functions, such as user authentication. Although not shown in FIG. 1A, it will be appreciated that the RAN 103/104/105 and/or the core network 106/107/

109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with a RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include a core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
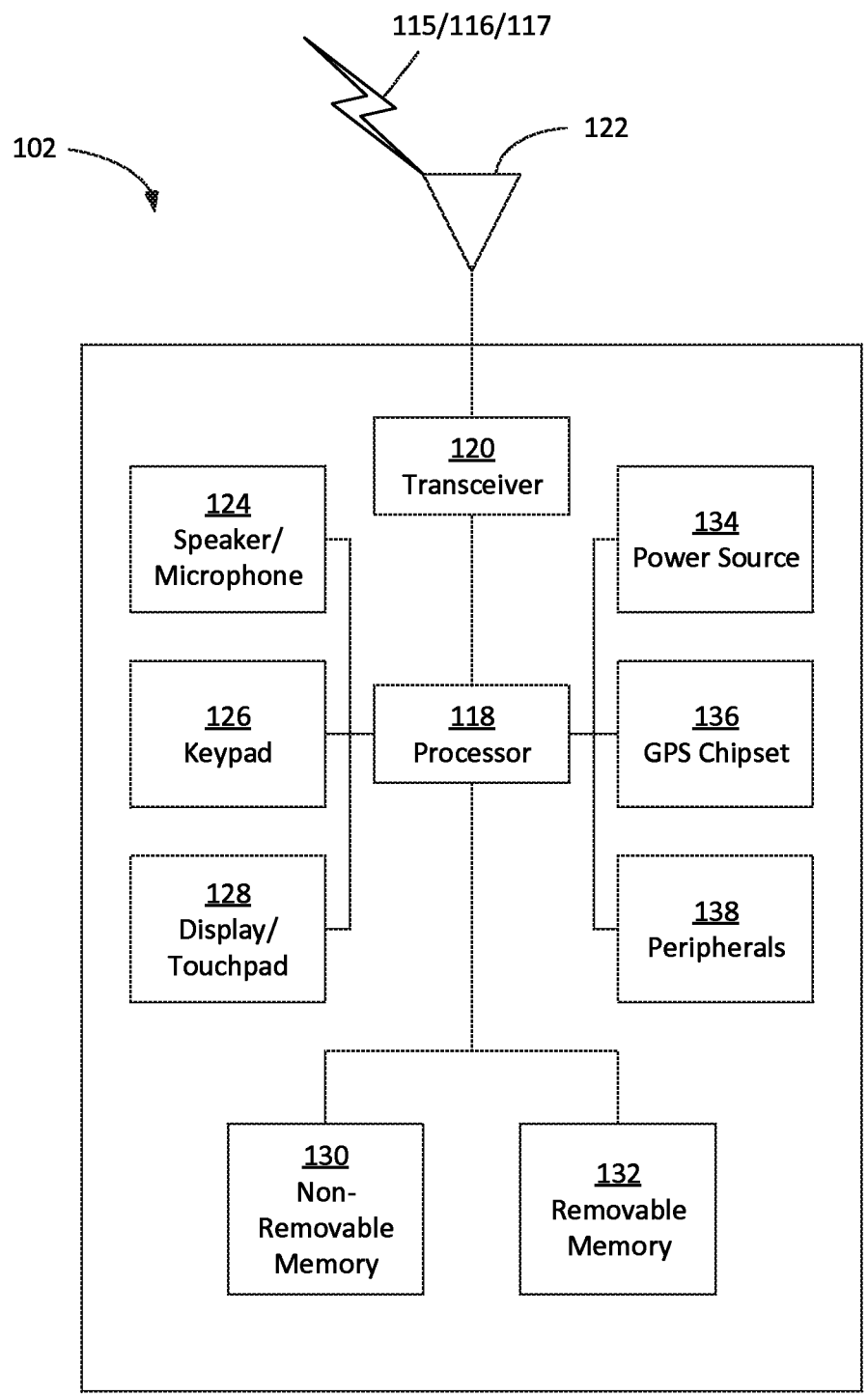
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion)), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
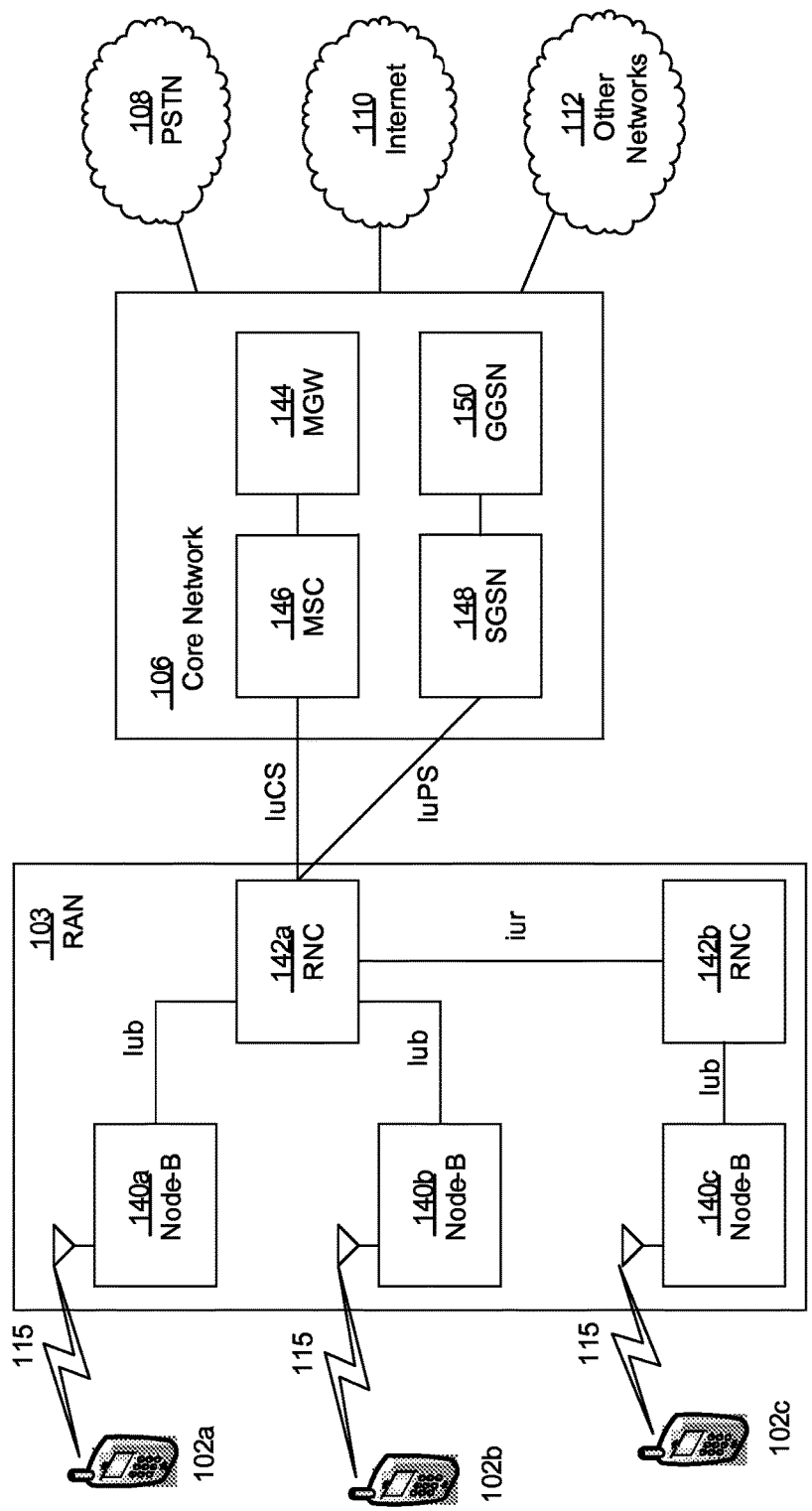
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
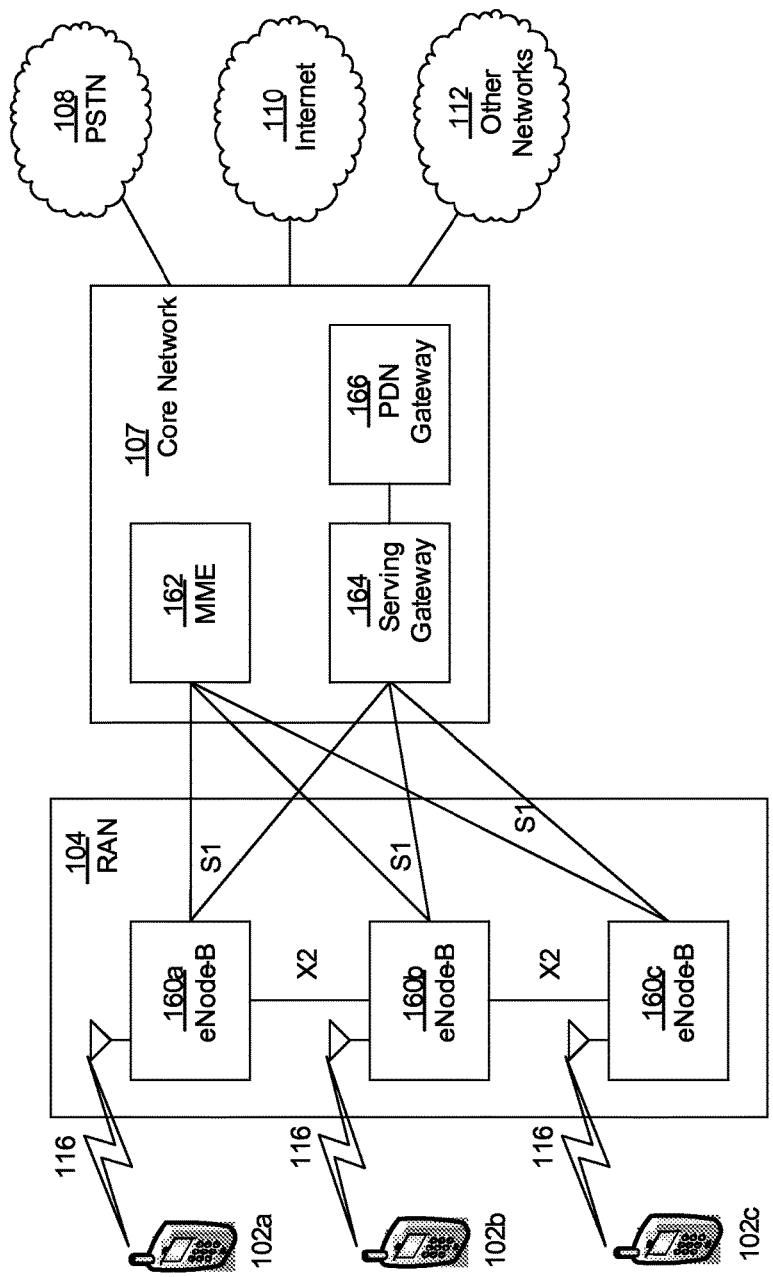
FIG. 1D is a system diagram of an example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
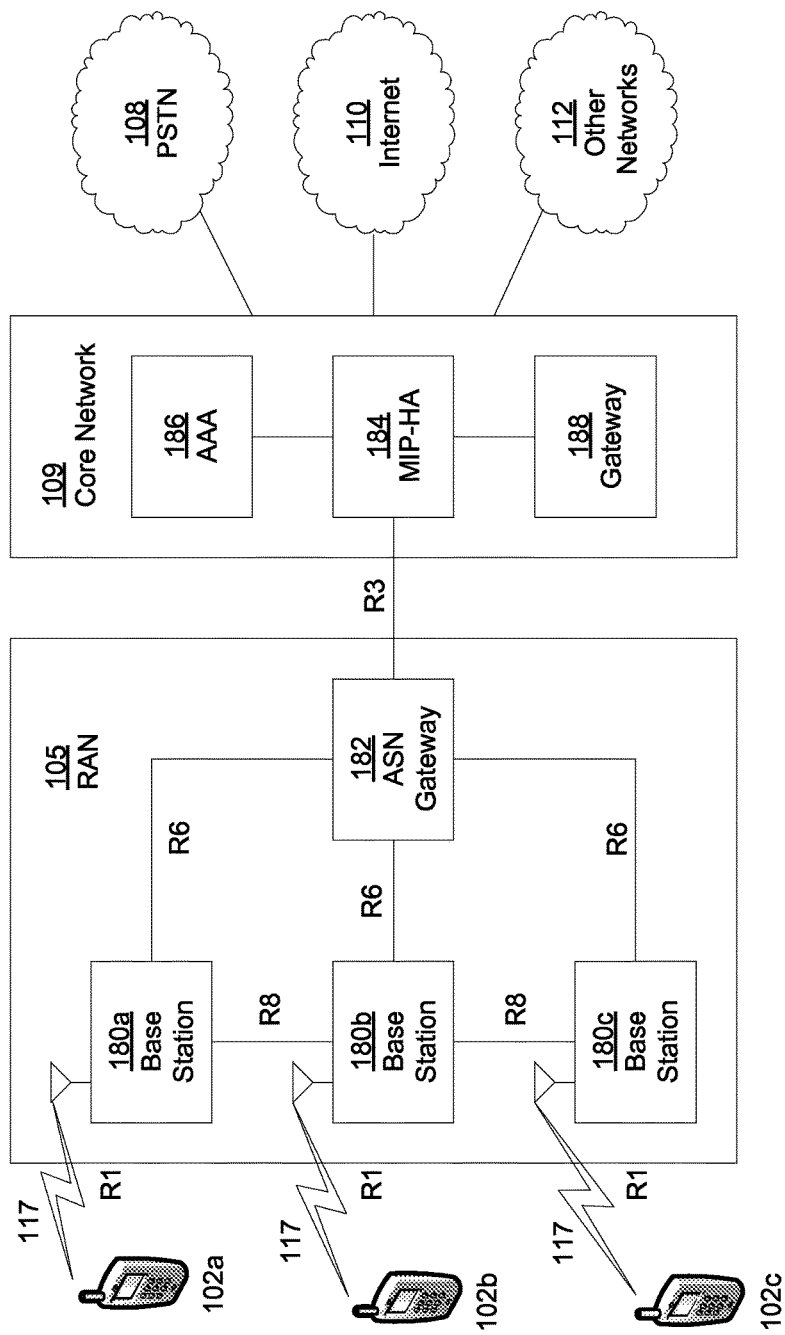
FIG. 1E is a system diagram of an example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2:
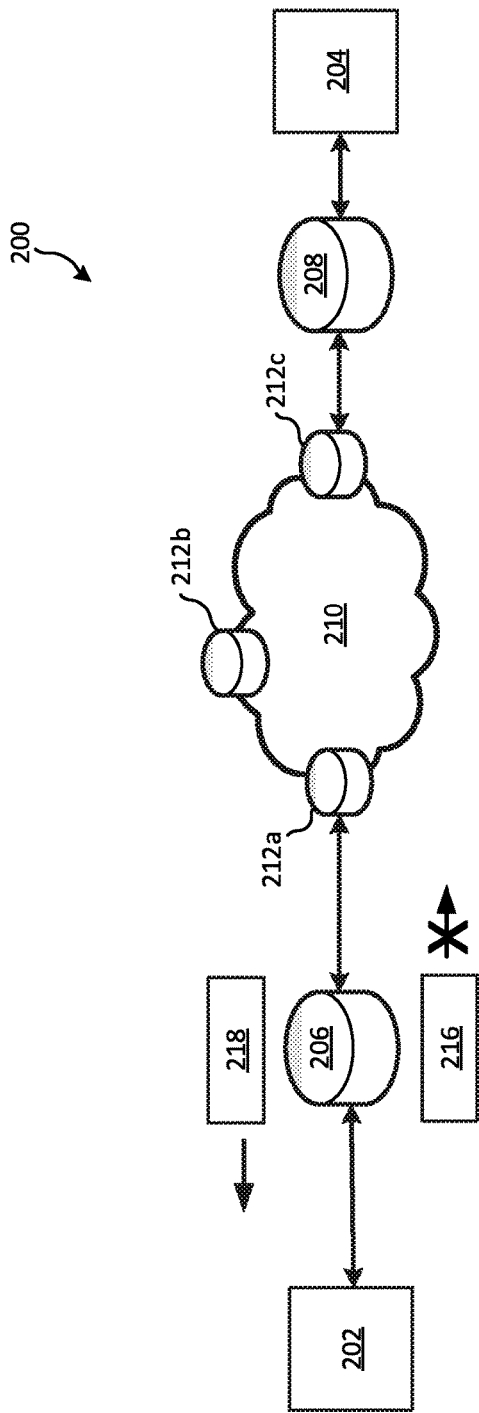
FIG. 2 is a diagram illustrating an example a two-way video call.

FIG. 2 is a diagram illustrating an example two-way video call 200 between a first video client 202 and a second video client 204. The two-way video call 200 may include an exchange of one or more information packets 216, 218 between the first video client 202 and the second video client 204 through one or more network devices 206, 208, 212a-c. For example, a first information packet 216 may be sent by the first video client 202 to the second video client 204 and a second information packet 218 may be sent by the second video client 204 to the first video client 202. An information packet (e.g., such as the information packets 216, 218) may include an IP packet encapsulating a UDP or TCP packet carrying data (e.g., such as video data) and/or the like. The one or more network devices 206, 208, 212a-c, may include one or more routers, one or more access points, and/or one or more eNodeBs. The first video client 202 may send a first information packet 216 to the second video client 204. The second video client 204 may send a second information packet 218 to the first video client 202. A first network device 206 (e.g., a first router) may receive one or more packets addressed to the first video client 202 and one or more packets addressed to the second video client 204. The network devices 206, 208, 212a-c may be border gateway routers, eNodeB, WiFi AP, and/or the like. The first network device 206 may detect (e.g., determine) the loss of the first information packet 216. For example, the first network device 206 may drop (e.g., lose) the first information packet 216 addressed to the second video client 204. For example, the first network device 206 may experience congestion and as a result may be forced to drop (e.g., lose) the first information packet 216 addressed to the second video client 204.

The first network device 206 may send the packet loss information to the first video client 202. For example, the first network device 206 may modify the second information packet 218 by adding (e.g., piggybacking) the packet loss information to the second information packet 218. The packet loss information may indicate that the first information packet 216 has been lost. When the first video client 202 receives the packet loss information, the first video client 202 may identify (e.g., prior to receiving a receiver report message) the lost first information packet 216 and may take corrective action. The two-way video call 200 may be implemented using a system architecture such as the systems depicted in FIG. 1C through FIG. 1E. For example, the first video client and/or the second video client may be a WTRU 102 (e.g., a smart phone handset or a tablet computer, etc.).

A network device (e.g., a router) may obtain a source IP address and/or a destination IP address of the lost first information packet 216. For example, the source IP address and/or the destination IP address may be obtained by reading octet:12-15 and octet:16-19 of an IP packet header, respectively.

A network device may determine the port number associated with the packet loss information. A sending port number at which a video client sends one or more video packets may not be the same as the receiving port number at which the video client receives one or more video packets.

Figure 3:
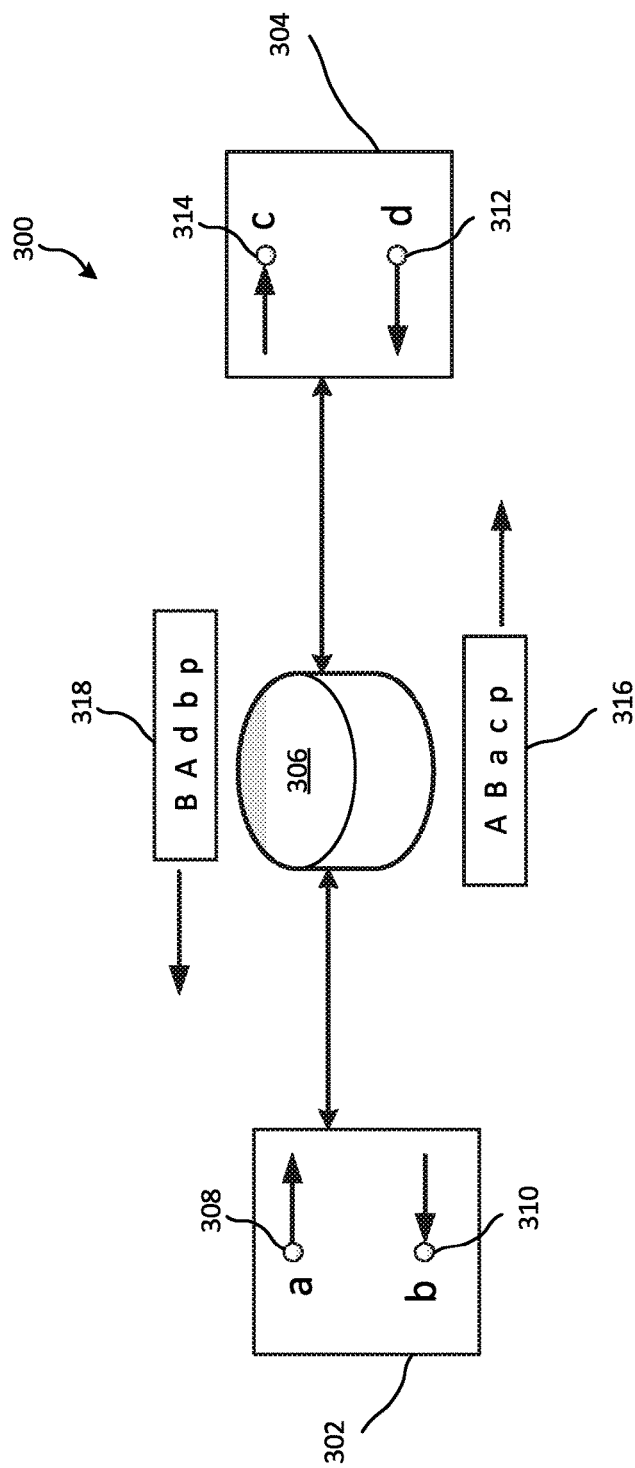
FIG. 3 is a diagram illustrating an example information packet exchange between two video clients.

FIG. 3 is a diagram illustrating an example information packet exchange 300 between two video clients. A first video client 302 may have an IP address (A), a first sending port 308 (a), and a first receiving port 310 (b). A second video client 304 may have an IP address (B), a second receiving port 314(c), and a second sending port 312(d). A packet may be represented by an IP 5-tuple (e.g., source IP address, destination IP address, source port number, destination port number, protocol number). For example, the IP address of the first video client 302 may be represented by 'A' and the IP address of the second video client 304 may be represented by 'B.' The port number of the first sending port 308 may be represented by 'a' and the port number of the first receiving port 310 may be represented by 'b.' The port number of the second receiving port 314 may be represented by 'c' and the port number of the second sending port 312 may be represented by 'd.' A first information packet 316 sent from the first video client 302 to the second video client 304 may be represented as 'ABacp.' A second information packet 318 sent from the second video client 304 to the first video client 302 may be represented as 'BAdbp.' The protocol number, p, may be obtained by reading the 9th octet from an IP packet header. For example, when the protocol number is 17 (UDP), the source port number and destination port number may be obtained from reading octet:0,1 and octet:2,3 respectively, of the UDP packet header.

A network device 306 (e.g., a router) may detect (e.g., determine) the loss of the first information packet 316 sent by the first video client 302 and addressed to the second video client 304. For example, the network device 306 may drop (e.g., lose) the first information packet addressed to the second video client 304. The network device 306 may modify a second information packet 318 being sent to the first video client 302 by adding packet loss information (e.g., piggybacking the packet loss information). For example, the network device 306 may indicate an RTP sequence number of the lost information packet via the packet loss information. The network device 306 may determine the receiving port number 310 where the first video client 302 receives packets (e.g., destination port number (b)). A lost information packet may not indicate the receiving port number of the sending client. The information packet exchange 300 may be implemented using a system architecture such as the systems depicted in FIG. 1C through FIG. 1E. For example, the first video client 302 and/or the second video client 304 may be a WTRU 102 (e.g., a smart phone handset or a tablet computer, etc.).

Figure 4:
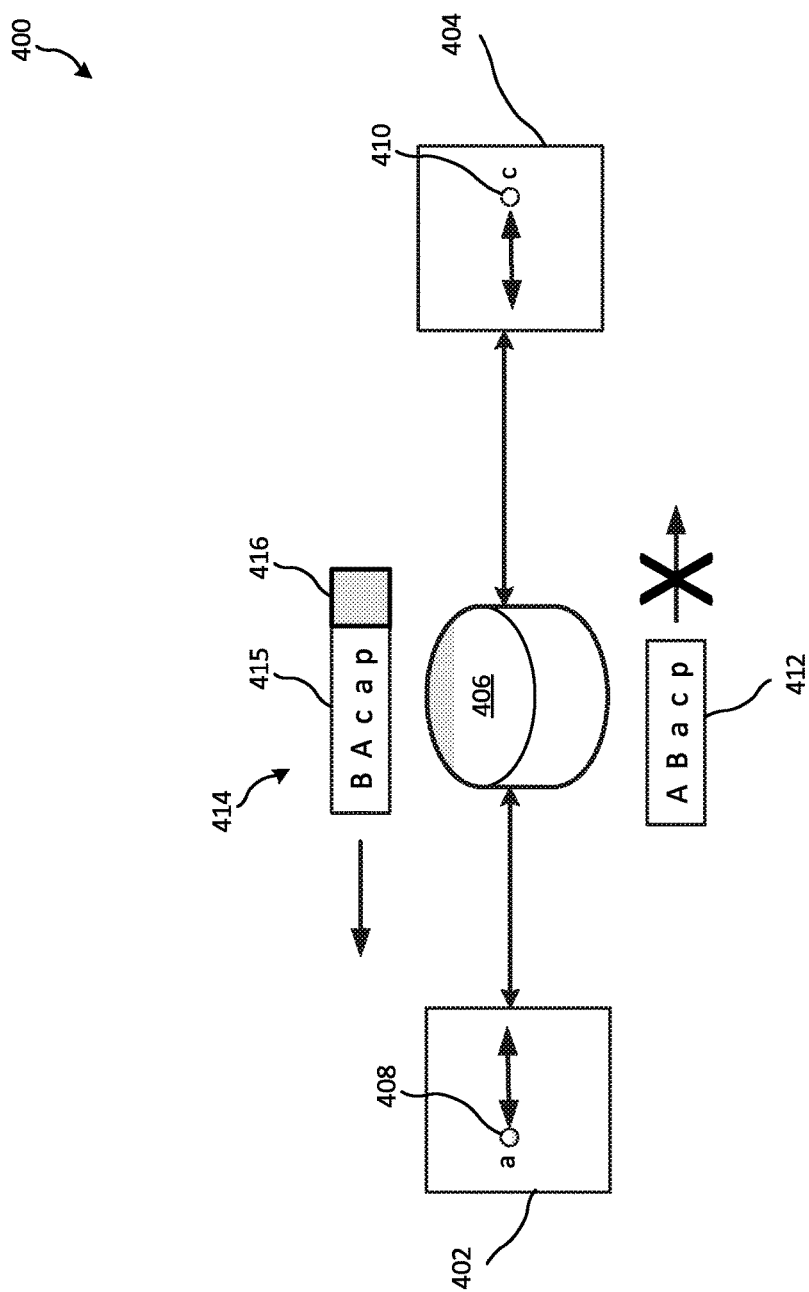
FIG. 4 is a diagram illustrating an example information packet exchange between two video clients with symmetric port numbers.

FIG. 4 is a diagram illustrating an example information packet exchange 400 between two video clients with symmetric port numbers (e.g., RFC 4961). A first client 402 may have an IP address, A, and a port 408, a, for sending and receiving data. A second client 404 may have an IP address, B, and a port 410, c, for sending and receiving media.

Two or more video clients, for example, the first client 402 and the second client 404, using Web Real-Time Communications (WebRTC) may use symmetric port numbers. A WebRTC video client (e.g., the first client 402 and/or the second client 404) may send and receive packets via one port number. The WebRTC video client may send video and audio for a session via the one port number. A network device 406 may determine (e.g., infer) a source IP address (A), destination IP address (B), source port number (a) and destination port number (c), and the RTP sequence number of an information packet (e.g., a video packet). The network device 406 may perform deep packet inspection (DPI) of the information packet (e.g., to make sure that the dropped packet belongs to a video flow). The network device 406 may determine whether the information packet belongs to a video flow or may inspect the IP Differentiated Services Code Point (DSCP) field (e.g., RFC 4594).

The network device 406 may determine that a first information packet 412 sent from the first client 402 to the second client 404 has been lost (e.g., using DPI). For example, the network device 406 may infer a missing RTP sequence number of the lost first information packet 412. The network device 406 may drop the first information packet 412. The network device 406 may examine one or more information packets to find an information packet addressed to the first client 402 (e.g., a second information packet 414, BAcap). The network device may receive a second information packet 414 sent from the second client 404 to the first client 402. The second information packet 414 may be represented by an IP 5-tuple 415 and an IP options field 416, which is a part of the IP header. The network device 406 may modify the second information packet 414 by adding (e.g., piggybacking) packet loss information. The packet loss information may include an RTP sequence number of the first information packet 412. The RTP sequence number (e.g., that is piggybacked as a part of the packet loss information in the second information packet 414), may be the highest RTP sequence number of one or more lost t information packets (e.g., such as the first information packet 412) sent by the first client 402.

Figure 6A:
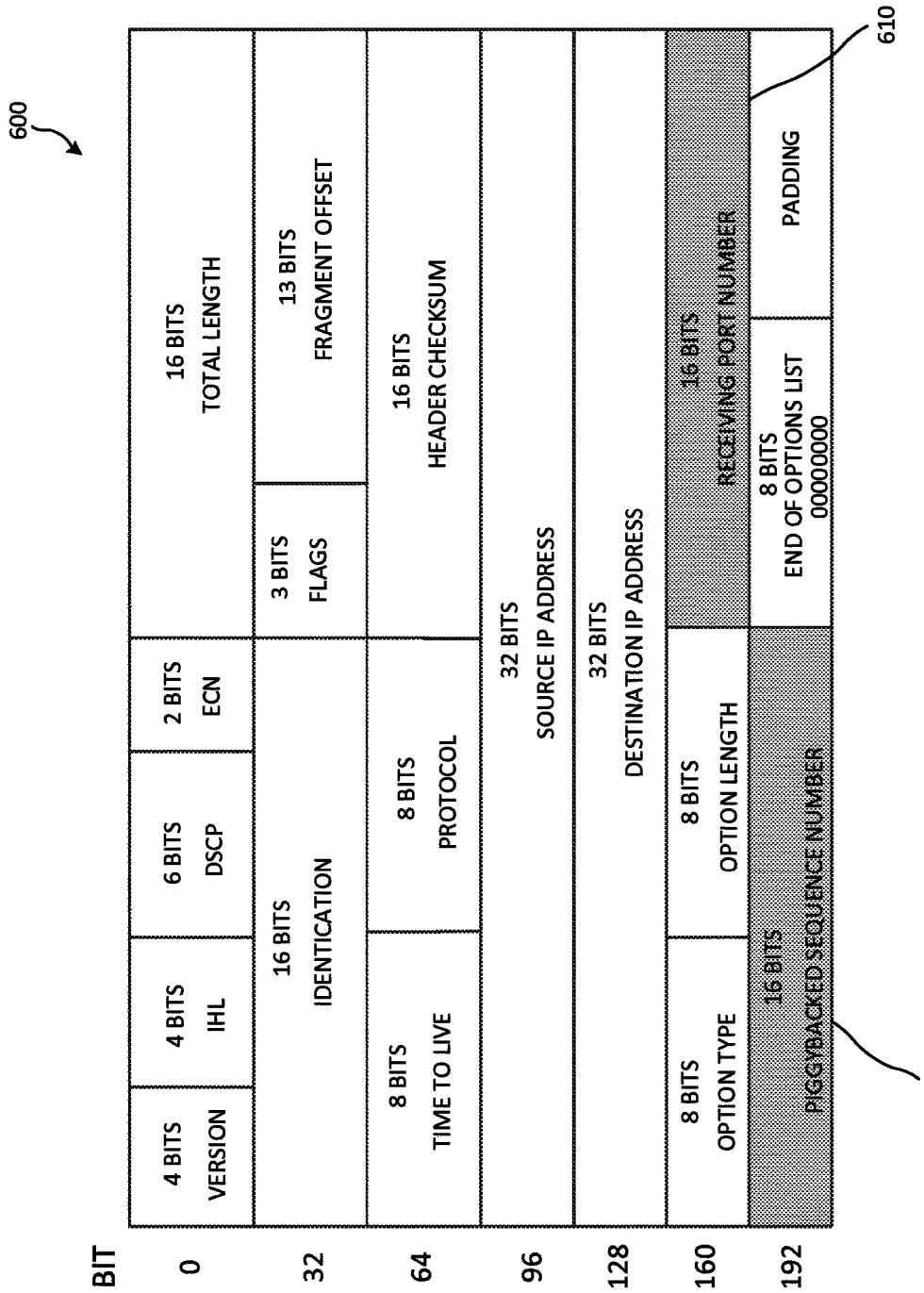
FIG. 6A is a diagram illustrating an example IPv4 header that includes a receiving port number and a piggybacked sequence number.

The RTP sequence number may be included in the IP options field 416 of the second information packet 414 (e.g., as shown in FIG. 6A). IP option numbers that may be used include 26, 27, 28, 29, 31, etc. The 5-bit IP option number may be part of the option-type octet (e.g., as in RFC 791).

Figure 6B:
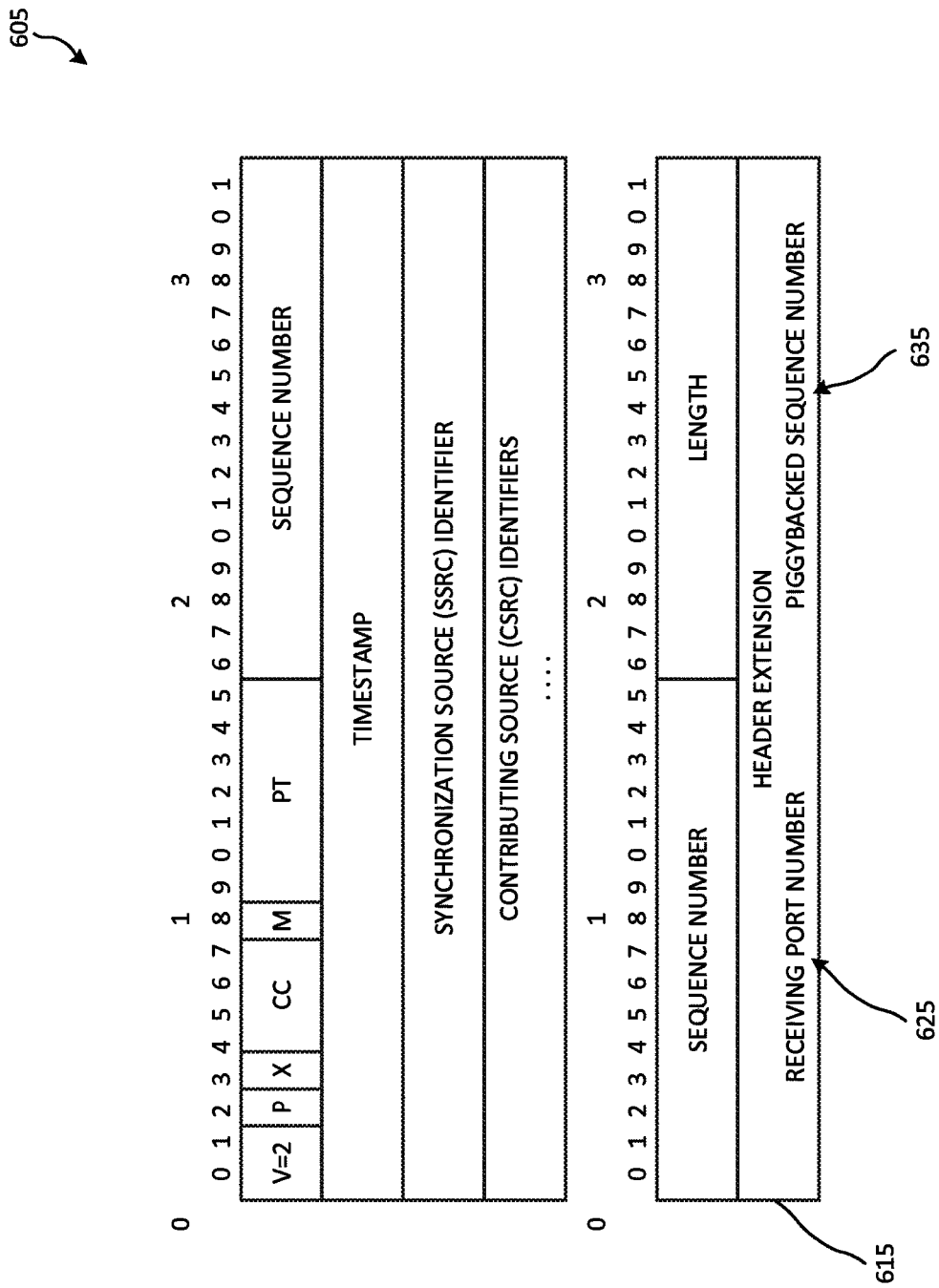
FIG. 6B is a diagram illustrating an example Real-time Transport Protocol (RTP) header extension with a receiving port number and a piggybacked sequence number.

The RTP sequence number may be included in the extension RTP header of the second information packet 414 (e.g., as shown in FIG. 6B). One or more fields of interests in the extension RTP header may include the length, (X), and header extension field. The length field may represent the number of 32 bit words that are additionally sent in the header. The number of 32 bit words may exclude the four-octet extension header. The length field may need one 32 bit word (e.g., 16 bits each for receiving port number and piggybacked sequence #), such that length is set to 1. The bit (X) may be set to 1, using the header extension to send additional information (RFC 3550). The receiving port number and piggybacked sequence number may be in the header extension field (e.g., as shown in FIG. 6B).

With reference to FIG. 4, the first client 402 may receive the modified second information packet 414. The first client 402 may detect a presence of the RTP (e.g., piggybacked) sequence number 416 (e.g., by reading the IP options field). The first client 402 may take corrective action based on the modified second information packet 414.

In a RTCP XR report, a client may differentiate between packet loss (e.g., piggybacked) information and normal feedback information. For example, if the most recent sequence number of a lost video packet obtained by piggybacking may be represented by r, and a highest most recent sequence number of the lost video packet obtained by RTCP XR may be represented by $\tilde{r}$, let f be the most recent sequence number for which a corrective action was taken by the client. When $r>\tilde{r}$, and $r>f$, the client may take corrective action by considering the most recent piggybacked information (e.g., neglecting the RTCP XR report. If $r \leq \tilde{r}$, and $f<\tilde{r}$, then the client may take corrective action for $\tilde{r}$, by considering the RTCP XR report (e.g., neglecting the piggybacked information. The information packet exchange 400 may be implemented using a system architecture such as the systems depicted in FIG. 1C through FIG. 1E. For example, the first video client 402 and/or the second video client 404 may be a WTRU 102 (e.g., a smart phone handset or a tablet computer, etc.).

The IP options field and/or the RTP header extension field may not be encrypted.

Figure 5:
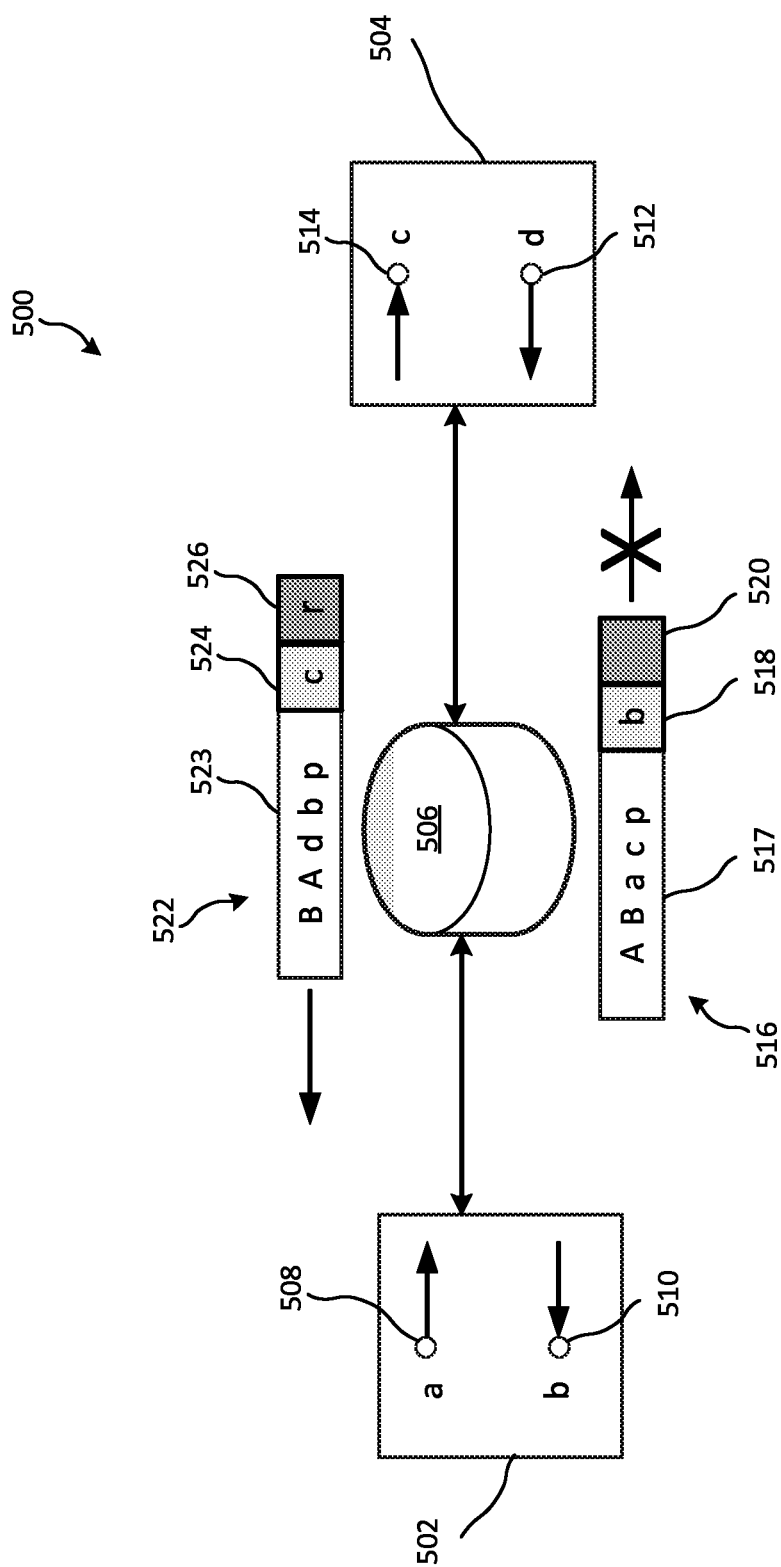
FIG. 5 is a diagram illustrating an example information packet exchange between two video clients with non-symmetric port numbers.

FIG. 5 is a diagram illustrating an example information packet exchange between two clients with non-symmetric port numbers. The two clients with non-symmetric port numbers may be configured (e.g., re-configured) to support EPLD by piggybacking. A first client 502 may have an IP address (A), a first sending port 508 (a), and a first receiving port 510 (b). A second client 504 may have an IP address (B), a second receiving port 514 (c), and a second sending port 512 (d). A packet (e.g., a first information packet 516) may be represented by an IP 5-tuple 517 and an IP options field. The IP options field may include 16 bits 518 (e.g., which may be used for sending the port number where the client is receiving video packets) and/or 16 bits 520 for piggybacking packet loss information if needed. When the first sending port 508 (a) is the source port of the packet, and the second receiving port 514 (c) is the destination port of the packet, the packet 516 sent from the first client 502 to the second client 504 may be represented as 'ABacpb_.'

When the first information packet 516 sent (e.g., addressed) to the second client 504 is dropped (e.g., lost), a network device 506 may determine (e.g., infer) a source IP address (A) of the first information packet 516, a destination IP address (B) of the first information packet 516, the sending port number 508 of the first client 502 (e.g., the port at which the first client 502 sends video packets), and the receiving port number 510 of the first client 502 (e.g., the port at which the first client 502 receives video packets). The network device 506 may examine one or more packets to identify an information packet addressed to the first client 502 (e.g., a second information packet 522 'BAdbpc_'). The network device may modify the second information packet 522 by adding packet loss information 526 (e.g., piggybacking the RTP sequence number (r) in the IP options field. The second information packet 522 may be represented by an IP 5-tuple 523 and an IP options field. The IP options field may include 16 bits 524 (e.g., which may be used for sending the port number where the client is receiving video packets) and/or packet loss information 526. The information packet exchange 500 may be implemented using a system architecture such as the systems depicted in FIG. 1C through FIG. 1E. For example, the first video client 502 and/or the second video client 504 may be a WTRU 102 (e.g., a smart phone handset or a tablet computer, etc.).

FIG. 6A is a diagram illustrating an example IPv4 header 600 that includes a receiving port number 610 and a piggybacked RTP sequence number 620. The piggybacked RTP sequence number 620 may represent the RTP sequence number of a lost packet (e.g., the highest RTP sequence number of one or more lost packets). The receiving port number 610 may represent the port number on which a sending client of the lost packet receives packets. The receiving port number 610 and the piggybacked RTP sequence number 620 may reside in the IP options field, wherein bit-0 through bit-159 of the IPv4 header 600 represents standard fields (RFC 791), and bit-160 through bit-223 of the IPv4 header 600 represent the IP options field. The receiving port number 610 may occupy bit-176 through bit-191. The piggyback sequence number 620 may occupy bit-192 through bit-207 of the IP options payload field.

FIG. 6B is a diagram illustrating an example RTP header 605 that includes a header extension 615 with a receiving port number 625 and a piggybacked RTP sequence number 635. The piggybacked RTP sequence number 635 may represent the RTP sequence number of a lost packet (e.g., the highest RTP sequence number of one or more lost packets). The receiving port number 625 may represent the port number on which a sending client of the lost packet receives packets.

A network device (e.g., a router) may not be aware of whether a client application is using symmetric or non-symmetric port numbers. When the port number where the client is receiving video packets is not sent in the IP packet (e.g., such as 524, 518 in FIG. 5) or in the RTP header extension field (e.g., such as 625 in FIG. 6B), the network device may determine that the client is using a symmetric port scenario. When the port number where the client is receiving video packets is sent, the network device may determine that the client is using a non-symmetric port scenario. The network may determine to enable EPLD by piggybacking. When the network enables EPLD by piggybacking, the client may determine to leverage EPLD by piggybacking. When using non-symmetric port numbers, a client may provide information identifying the receiving port number (e.g., when the client determines to leverage EPLD by piggybacking). The network may indicate to the participating clients in the video-call whether piggybacking is enabled (e.g., through some signaling such that a client-to-client signaling handshake is not necessary).

One or more clients (e.g., legacy clients) may not understand the piggybacking enabled/disabled signaling from the network. For example, the one or more clients may not provide receiving port information and/or may not read bit 192 through bit 207 of the IP packet header that may contain the piggybacked sequence number.

One or more clients that do not provide the receiving port information (e.g., legacy clients) may interact with one or more piggybacking-aware clients. For piggybacking-aware clients that use non-symmetric ports, a client may send the receiving port information (e.g., on bit-176 through bit-191 of the IP packet header) via an IP packet. The client may examine one or more received IP packets to identify a piggybacked sequence number (e.g., on bit-192 through bit-207 of the IP packet header). For piggybacking-aware clients that use symmetric ports, a client may not send any information in bit-176 through bit-191 of the IP packet header. The client may examine a received IP packet to identify a piggybacked sequence number. A client may determine a packet loss via a receiver report message (e.g., RTCP XR).

A network device may determine (e.g., infer) a sending port number and/or a receiving port number of a client involved in video calling during call set up phase by using one or more SIP/SDP messages. When the network device uses the one or more SIP/SDP messages to determine the sending port number and/or the receiving port number, the client may not send port information (e.g., the receiving port number). For example, an eNodeB may use SIP/SDP messages to determine a receiving port number (e.g., even if TLS is in use). As another example, a router may use SIP/SDP messages exchanged between the video clients, and may determine a receiving port number if (e.g., only if) TLS is not in use.

A router may determine (e.g., infer) the receiving port number for two clients in a session such as the session illustrated below between Alice and Bob. The router may look for a "media" attribute in an INVITE message sent by Alice to Bob that has the syntax "m=<media><port><transport>", where the <port> information provides the receiving port number:

```
INVITE Alice -> atlanta.com proxy
To: Bob <sip:bob@biloxi.com>
From: Alice <sip:alice@atlanta.com>;tag=1928301774
Call-ID: a84b4c76e66710
Content-Type: application/sdp
************************************************
  * Content-Type: application/sdp                *
  * v=0                                          *
  * o=alice 53655765 2353687637 IN IP4 pc33.atlanta.com *
  * c=IN IP4 pc33.atlanta.com                    *
  * m=video 51372 RTP/AVP 32                     *
  * a=orient:portrai                             *
```

In the syntax "m=<media><port><transport>" above, 51372 may represent the port number at which Alice is receiving video media. The router may determine (e.g., infer) the receiving port number of Bob (e.g., using the SDP message corresponding to a 200 OK message sent by Bob).

Figure 7:
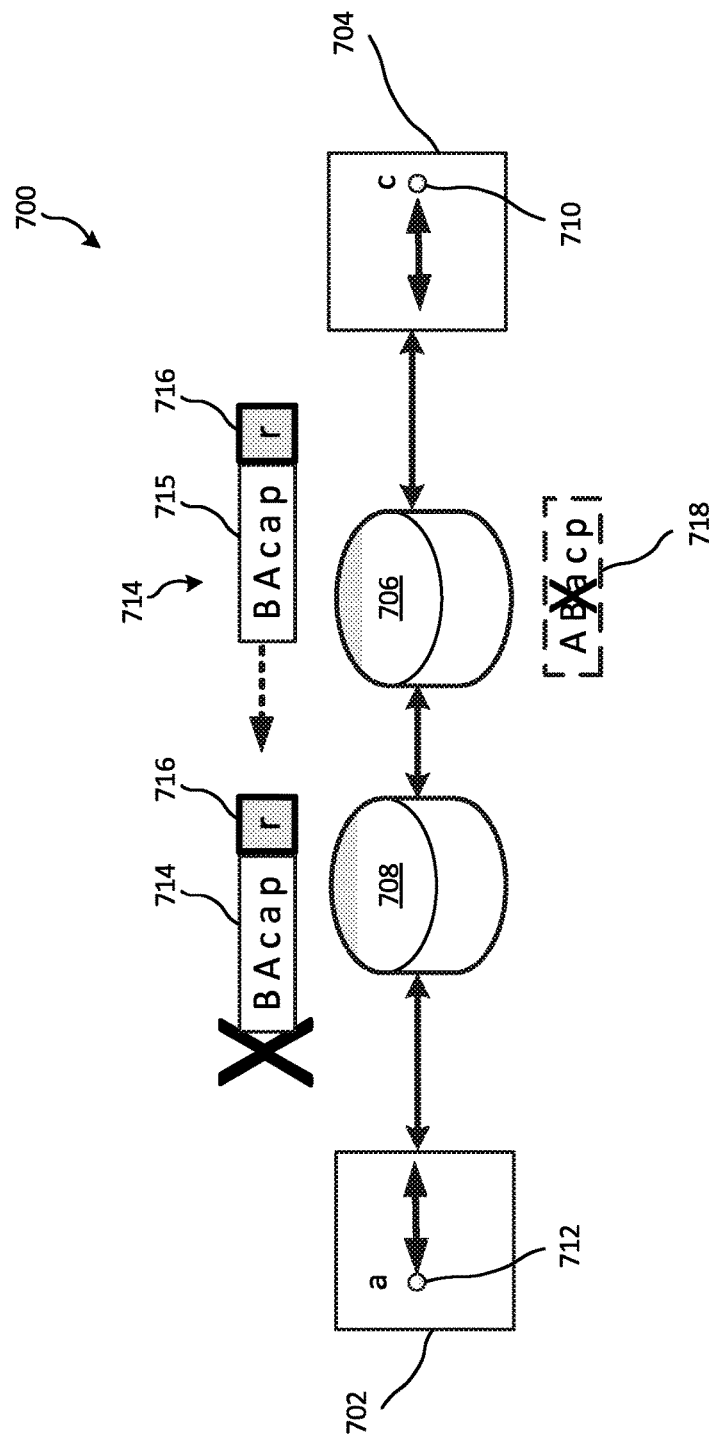
FIG. 7 is a diagram illustrating an example information packet exchange between two clients via multiple network devices.

FIG. 7 is a diagram illustrating an example information packet exchange 700 between two clients 702, 704 via multiple network devices 706, 708. An information packet exchange 700 between a first client 702 and a second client 704 via a first network device 706 and a second network device 708 may perform EPLD. The first client 702 may be represented by an IP address (A) and a port 712 (*a*) for sending and receiving data. The second client 704 may be represented by an IP address (B) and a port 710 (*c*) for sending and receiving data. The first network device 706 and the second network device 708 may wirelessly connect the first client 702 and the second client 704. When a first packet 718 transmitted (e.g., sent) from the first client 702 to the second client 704 is lost (e.g., gets dropped at the first network device 706), packet loss information may be added to (e.g., piggybacked in) a second packet 714 going in the other direction (e.g., from the second client 704 to the first client 702) at the first network device 706. The second packet 714 may be represented by an IP 5-tuple 715 and an IP options field 716. The IP options field 716 may include the packet loss information.

The second packet 714 (e.g., a modified packet carrying the packet loss information) may be lost. The second packet 714 may reach the second network device 708 and may be lost (e.g., get dropped at the second network device 708). The second packet 714 may be lost due to congestion. The second network device 708 may receive the source IP address (B), destination IP address (A), and the destination port number (a) of the second packet 714. The second network device 708 may receive the packet loss information (e.g., piggybacked information) that includes the RTP sequence number (r) of the first packet 718. The packet loss information may be the same packet loss information carried in the second packet 714. The second network device 708 may store the RTP sequence number (r) of the first packet 718. The second network device 708 may look for a packet (e.g., a third packet) with a source IP address, a destination IP address, a source port number, and a destination port number is (BAca). The second network device 708 may receive the third packet (not shown). The second network device 708 may modify the third packet by adding the packet loss information (e.g., piggybacking the RTP sequence number (r)). EPLD piggybacking may be performed on an information packet exchange between two clients with non-symmetric port numbers via multiple network devices (e.g., as discussed with respect to FIG. 5). The information packet exchange 700 may be implemented using a system architecture such as the systems depicted in FIG. 1C through FIG. 1E. For example, the first video client 702 and/or the second video client 704 may be a WTRU 102 (e.g., a smart phone handset or a tablet computer, etc.).

A network device may prioritize packets with packet loss information (e.g., piggybacked loss information). The network device may use the presence of piggybacked loss information to modify the per-hop behavior (PHB) and/or the DSCP class of one or more IP packets (e.g., to increase priority). The network device may modify the IP DSCP field (e.g., to 46 which may indicate expedited forwarding). If the current PHB of a packet is set to AFxy, the network device may modify the PHB to AFpq (e.g., where p≥x, q≥y).

The network device may detect a gap in RTP sequence numbers of a flow (e.g., N packets of a video flow) that passes through the network device. The network device may piggyback one or more sequence numbers corresponding to the gap in RTP sequence numbers of the flow. The network device may piggyback the one or more sequence numbers when the gap in RTP sequence numbers is greater than N. For example, considering N packets to detect the missing sequence number may allow for out-of-sequence packet delivery in a time window (e.g., a short time window).

Figure 8:
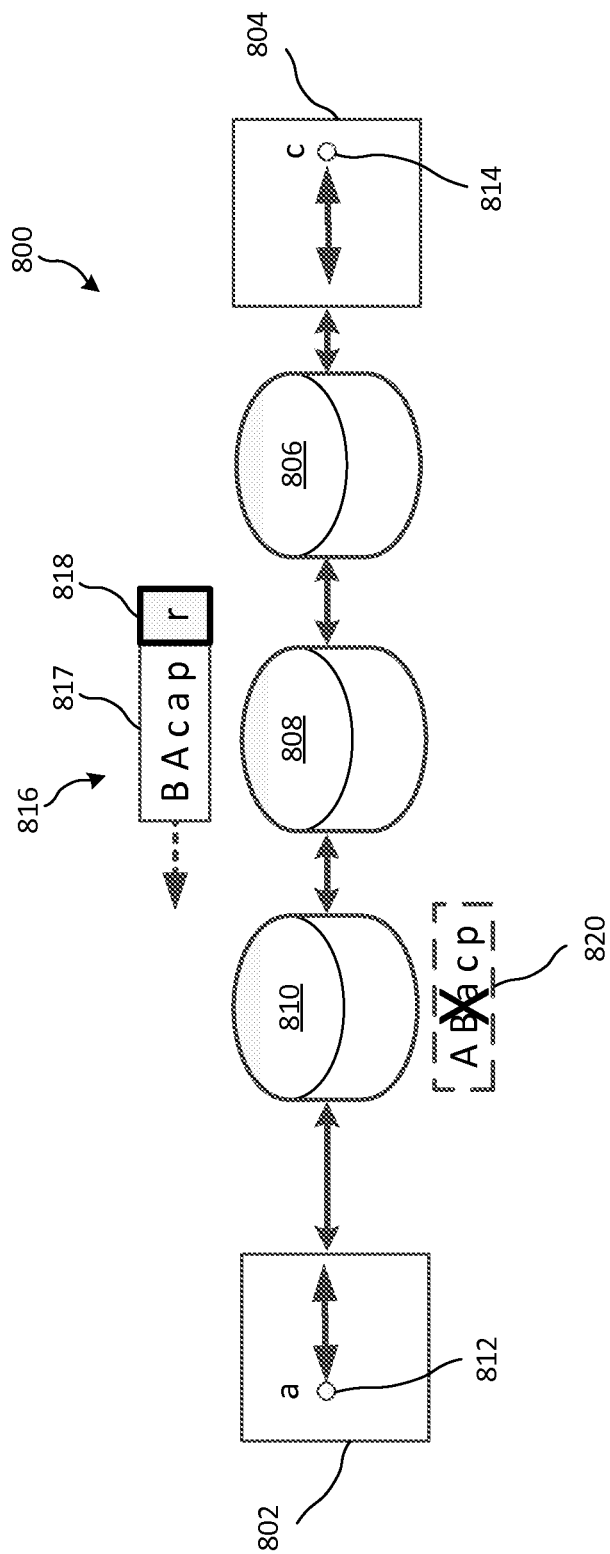
FIG. 8 is a diagram illustrating an example information packet exchange between two clients via multiple network devices.

FIG. 8 is a diagram illustrating an example information packet exchange 800 between two clients 802, 804 via multiple network devices 806, 808, 810. The information packet exchange 800 between a first client 802 and a second client 804 via multiple network devices 806, 808, 810 may perform EPLD. The first client 802 may have a first IP address (A) and a first port 812 (*a*) for sending and receiving media. The second client 804 may have a second IP address (B), and a second port 814 (*c*) for sending and receiving media. A plurality of network devices, a first network device 806, a second network device 808, and a third network device 810, may wirelessly connect the first client 802 and the second client 804.

The third network device 810 may determine that a first packet 820 transmitted from the first client 802 to the second client 804 was lost. For example, the third network device may drop the first packet 820. A network device (e.g., the second network device 808) may receive a second packet 816 that is sent from the second client 804 to the first client 802. The second packet 816 may be represented by an IP 5-tuple 817 and an IP options field 818. Packet loss information that indicates the loss of the first packet 820 may be inferred by the second network device 808. The packet loss information may be added (e.g., piggybacked) to the second packet 816, for example, in the IP options field 818. The packet loss information may be added to the second packet 816 at the second network device 808. The packet loss information may indicate a sequence number of the lost first packet 820.

A packet may be dropped (e.g., lost) by an upstream network device that does not perform EPLD (e.g., does not support piggybacking). A downstream network device may support piggybacking and may perform EPLD based on the packet lost at the upstream network device. For example, the first network device 806 and the third network device 810 may not support piggybacking, while the second network device 808 may support piggybacking. When a first packet 820 with an RTP sequence number (r) is lost (e.g., dropped) by the third network device 810, the second network device 808 (e.g., the piggybacking-enabled downstream router) may detect the missing RTP sequence number. The second network device 808 may add (e.g., piggyback) the RTP sequence number to the second packet 816 addressed to the first client 802 (e.g., in the reverse flow). For example, the second network device 808 may add (e.g., piggyback) the RTP sequence number to the IP options field 818 of the second packet 816. The information packet exchange 800 may be implemented using a system architecture such as the systems depicted in FIG. 1C through FIG. 1E. For example, the first video client 802 and/or the second video client 804 may be a WTRU 102 (e.g., a smart phone handset or a tablet computer, etc.).

EPLD techniques herein may apply to network devices such as an eNodeB, a S-GW, a P-GW, a WiFi AP, etc. For example, the eNodeB/AP may determine a video flow to which a lost video packet belongs. The eNodeB/AP may determine port number information (e.g., the receiving port numbers of the clients in the video flow) and/or the source/destination IP address based on one or more packets (e.g., previous packets) that have been received correctly.

Figure 9:
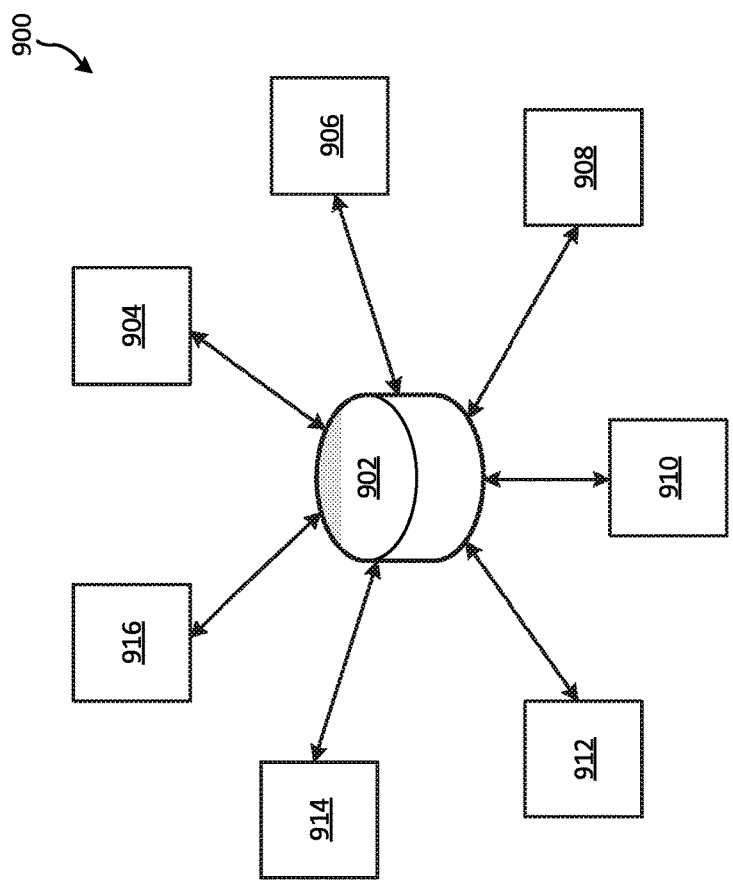
FIG. 9 is a diagram illustrating an example Middlebox use case for piggybacking.

FIG. 9 is a diagram illustrating an example Middlebox use case for piggybacking. EPLD techniques disclosed herein may apply to a Middlebox 902. The Middlebox 902 may represent a video conference bridge, an MCU acting as router, a video mixer, and/or the like. The Middlebox 902 may connect a plurality of clients 904, 906, 908, 910, 912, 914, 916. The Middlebox 902 may act as a hub through which one or more packets from the plurality clients 904, 906, 908, 910, 912, 914, 916 pass through. A first packet of the one or more packets may be lost at the Middlebox 902 or at an upstream network device. The Middlebox 902 may determine that the first packet has been lost and may piggyback packet loss information onto a second packet sent to the sender of the lost packet. The Middlebox 902 may be an example of a network device.

Figure 10:
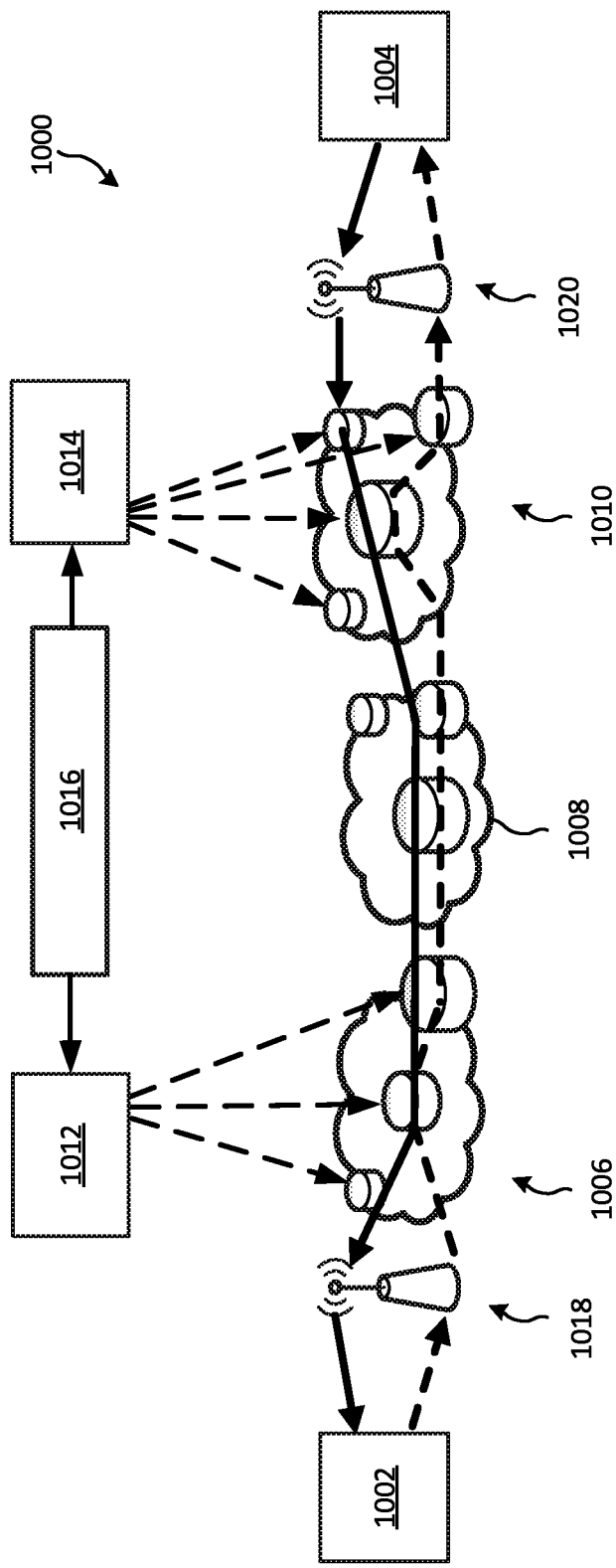
FIG. 10 is a diagram illustrating an example system that employs piggybacking using software defined networks (SDNs).

FIG. 10 is a diagram of an example system 1000 that employs piggybacking using software defined networks (SDNs). EPLD techniques disclosed herein may be performed using SDNs. A first SDN controller 1012 may be controlling a first network 1006. The first network 1006 may include one or more network devices. A second SDN controller 1014 may be controlling a second network 1010. The second network 1010 may include one or more network devices. The first network 1006 and the second network 1010 may be connected via an internet 1008. A piggybacking protocol may be implemented in a SDN controller 1012, 1014. One or more piggybacking rules 1016 may be enforced in one or more network devices included in the first network 1006 and/or the second network 1010 (e.g., switches) by the first SDN controller 1012 and/or the second SDN controller 1014, respectively. A two-way video call between the first client 1002 and a second client 1004, may be established through the first network, 1006, the internet, 1008, and the second network 1010. The first SDN controller 1012 and/or the second SDN controller 1014 may implement the one or more piggybacking rules 1016. The one or more piggybacking rules 1016 may include at least one of the following: let f be the packet dropped by the switch; let the source IP address, source port number, destination IP address, destination port number, protocol number for f be A1, a1, B1, b1, p respectively; let m be the RTP sequence number of the dropped video packet; let k be the IP packet whose source IP address, source port number, destination IP address, destination port number, protocol number are respectively B1, b1, A1, a1, and p; and/or write the RTP sequence number, m, in the IP options field in packet k.

The one or more piggybacking rules 1016 may be propagated to the one or more network devices included in the first network 1006 and/or the second network 1010 (e.g., the network devices that the first SDN controller 1012 and/or the second SDN controller 1014 have access to). The first SDN controller 1012 and/or the second SDN controller 1014 may modify the one or more piggybacking rules 1016 (e.g., as and when necessary).

A SDN controller may not manage the entire Internet and may control only a wireless access network (e.g., as shown in FIG. 10). The first network 1006 may manage a first wireless access point 1018 and the second network 1010 may manage a second wireless access point 1020. A packet loss may be most likely to occur in a wireless access network, which for example, may lend itself to the use of piggybacking to handle EPLD.

Figure 11:
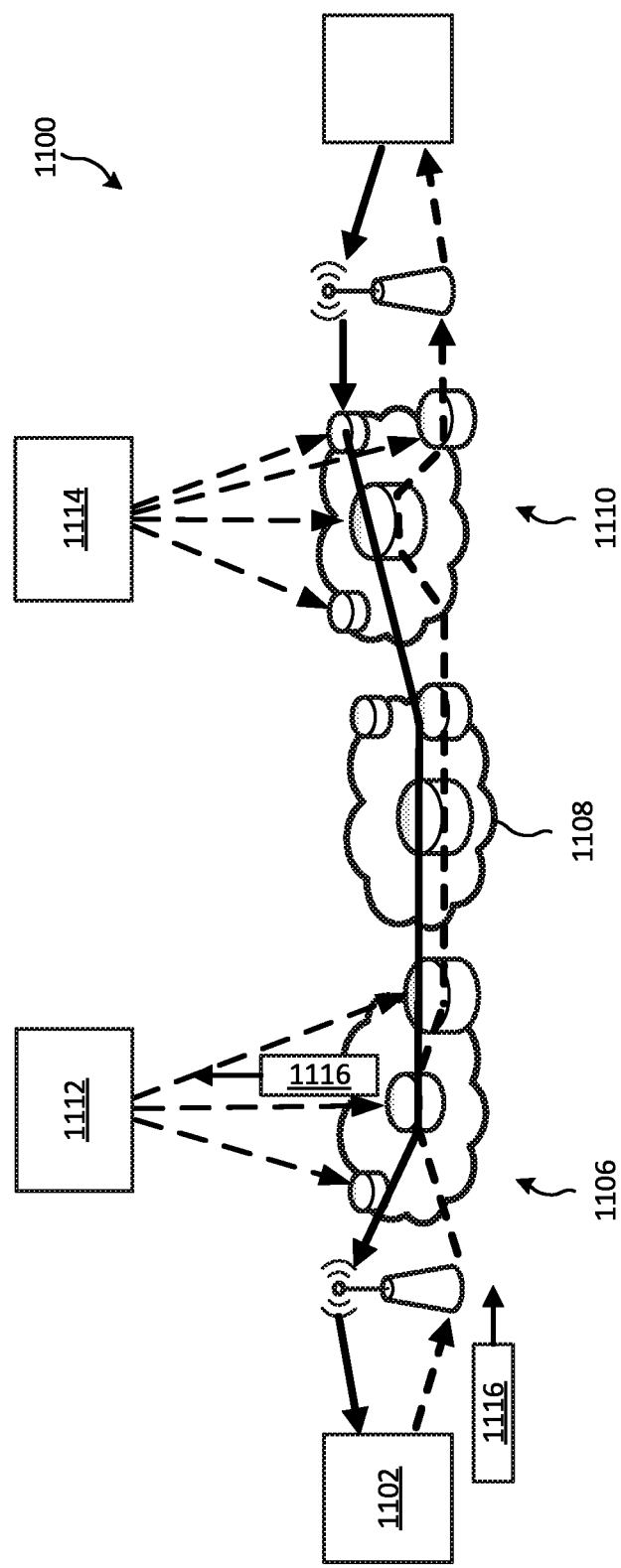
FIG. 11 is a diagram illustrating an example system that employs piggybacking using SDNs.

FIG. 11 is a diagram of an example system 1100 that employs piggybacking using SDNs. A first SDN controller 1112 may be controlling a first network 1106. The first network 1106 may include one or more network devices. A second SDN controller 1114 may be controlling a second network 1110. The second network 1110 may include one or more network devices. The first network 1106 and the second network 1110 may be connected via an internet 1108. One or more piggybacking rules (e.g., for SDN controllers) may be managed independently. The one or more piggybacking rules may be triggered by an application. For example, a user (e.g., such as the first user 1102) may initiate an application and the application may include an option to enable the one or more piggybacking rules (e.g., specify the policy). The user may enable the one or more piggybacking rules by means of an API (e.g., a standardized Northbound API, such as REST APIs) used for communication between a client (e.g., such as the first user 1102) and a SDN controller (e.g., such as the first SDN controller 1112). For example, the API may include the one or more piggybacking rules. A packet 1116 which contains the API may be sent from the first user 1102. The packet 1116 may be received by a network device (e.g., a switch) in the first network 1106. The network device may send the packet 1116 to the first SDN controller 1112. The first SDN controller 1112 may receive the packet 1116 and may determine the one or more piggybacking rules (e.g., enabled by the application) based on the packet 1116. The first SDN controller 1112 may implement the one or more piggybacking rules (e.g., enable piggybacking). The first SDN controller 1112 may propagate the one or more implemented piggybacking rules to one or more network devices.

EPLD may be performed to provide an early congestion indication. For example, the piggybacking methods described herein may be used to send an early congestion indication to a packet sending client. When congestion is detected, the network may mark a packet (e.g., analogous to explicit congestion notification (ECN), RFC 3168) in the reverse flow. Congestion information may be sent by a receiver (e.g., via RTCP reports or TCP ACKs). Congestion information using piggybacking methods may be sent by a network device between the sender and the receiver (e.g., an intermediate network entity determining the presence of packets belonging to the reverse flow).

Congestion may be determined at a network device and the network device may piggyback the congestion information in one or more packets (e.g., belonging to a reverse flow for the case of TCP and ECN enabled RTP). A forward flow and a reverse flow may be ECN capable. The network device may determine whether the forward flow and the reverse flow are ECN capable. To determine whether a flow is ECN capable, the network device may inspect the ECN field (e.g., two least significant bits of the DiffServ field in the IPV4 header) and/or the ECE field and the SYN field of the TCP header. For example, when the ECN field in the IPV4 header is 01 or 10, the flow may be ECN capable. As another example, when the SYN flag and the ECE flags are set in the TCP header, the flow may be ECN capable.

In case of TCP, a piggybacking congestion algorithm may be represented as:

```
Perform DPI to get the TCP header from the IP packet.
  /* Set the ECN Echo bit if (e.g., only if) ACK field is significant in
    the TCP packet*/
  if ACK == 1  /* ACK bit is set */
    if ECE == 0 /* ECN Echo bit is not set */
      ECE = 1
    end
end
```

The piggybacking congestion algorithm may modify the TCP header (e.g., as is done by the TCP receiver) to transmit the congestion information back to the sender. The piggybacking congestion indication algorithm may be different than a conventional congestion indication algorithm (e.g., as is done typically by a TCP receiver). For example, the piggybacking congestion indication algorithm may be performed by an intermediate network device by leveraging the presence of reverse flow. The conventional congestion indication algorithm may be performed by a receiver (e.g., TCP receiver) by making use of TCP ACKs sent by the receiver to the sender.

The piggybacked congestion information may be sent in the IP header (e.g., which may be applicable to TCP and/or ECN enabled RTP over UDP) by setting a bit (e.g., a bit in the IP options field) in a packet belonging to a reverse flow to indicate congestion in a forward flow. The ECN field of an IP packet of the reverse flow may not be modified. The ECN field of the IP packet of the reverse flow may represent congestion in the reverse flow.

EPLD by piggybacking may be performed in RTP audio data. A separate port (e.g., a different port from the port numbers assigned to send and receive video data) may be assigned to send and receive audio data. EPLD for audio data may be performed for clients with non-symmetric ports (e.g., such as the clients of FIG. 5). The network device may look for a dropped (e.g., lost) audio packet. The network device may determine (e.g., infer) an RTP sequence number associated with the dropped packet. The network device may determine a receiving audio port number associated with the dropped packet. The network device may use the receiving audio port number of the dropped packet to look for an audio packet with a corresponding receiving port number belonging to the reverse flow to piggyback the RTP sequence number. EPLD for audio data may be performed for clients with symmetric ports (e.g., such as the clients of FIG. 4) when the receiving and sending port numbers for both video and audio are same, such as in WebRTC. The network device may piggyback audio packet loss information on a packet belonging to a reverse audio flow. The network device may determine whether a packet comprises audio/video information by reading the Payload Type (PT) of the RTP header (e.g., bits 9-15).

Figure 12:
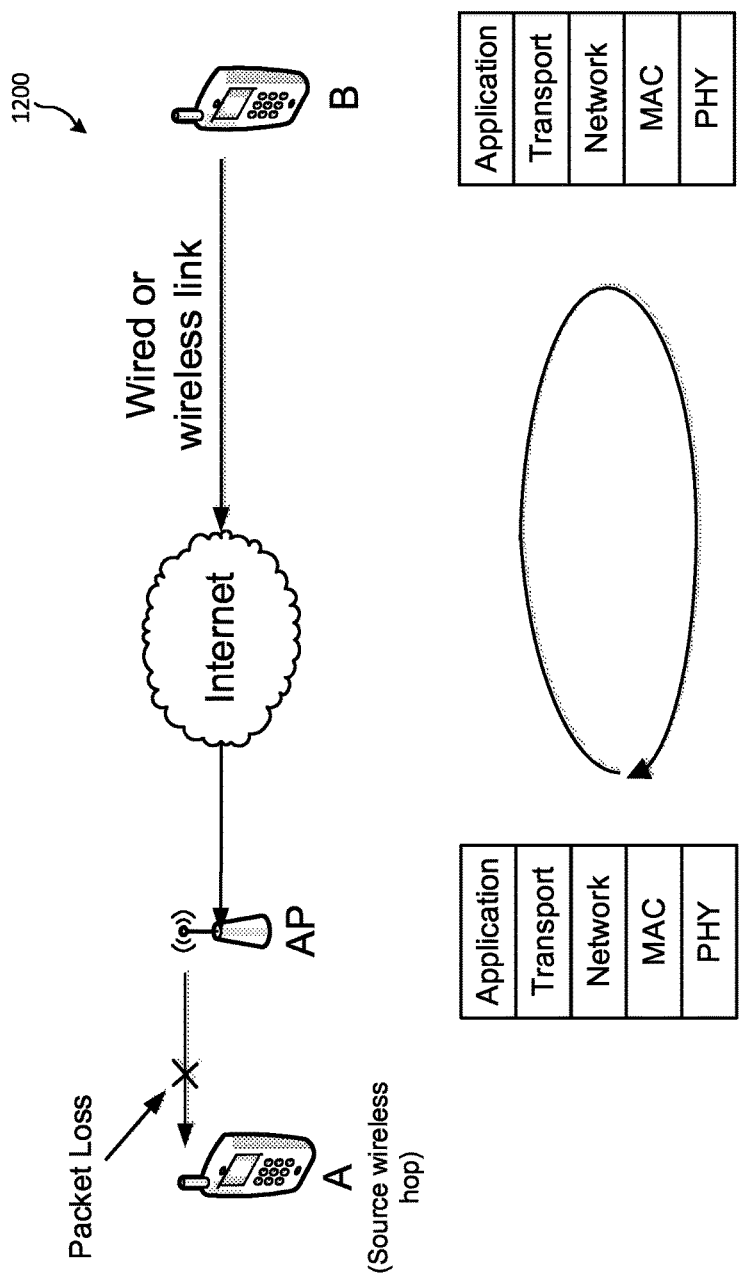
FIG. 12 is a diagram illustrating an example early packet loss detection (EPLD) in a downlink (DL) transmission.

FIG. 12 is a diagram illustrating an example EPLD in a downlink operation 1200. EPLD may be performed in downlink operations. A sender, such as client B, may send a transmission to a receiver, such as client A, via a wireless link (e.g., via an AP or an eNodeB). A packet may be lost in the transmission, for example, between the access point AP and client A. The access point AP may be configured to detect the lost packet and may send a NACK packet (e.g., a spoofed NACK packet) to the client.

Figure 13:
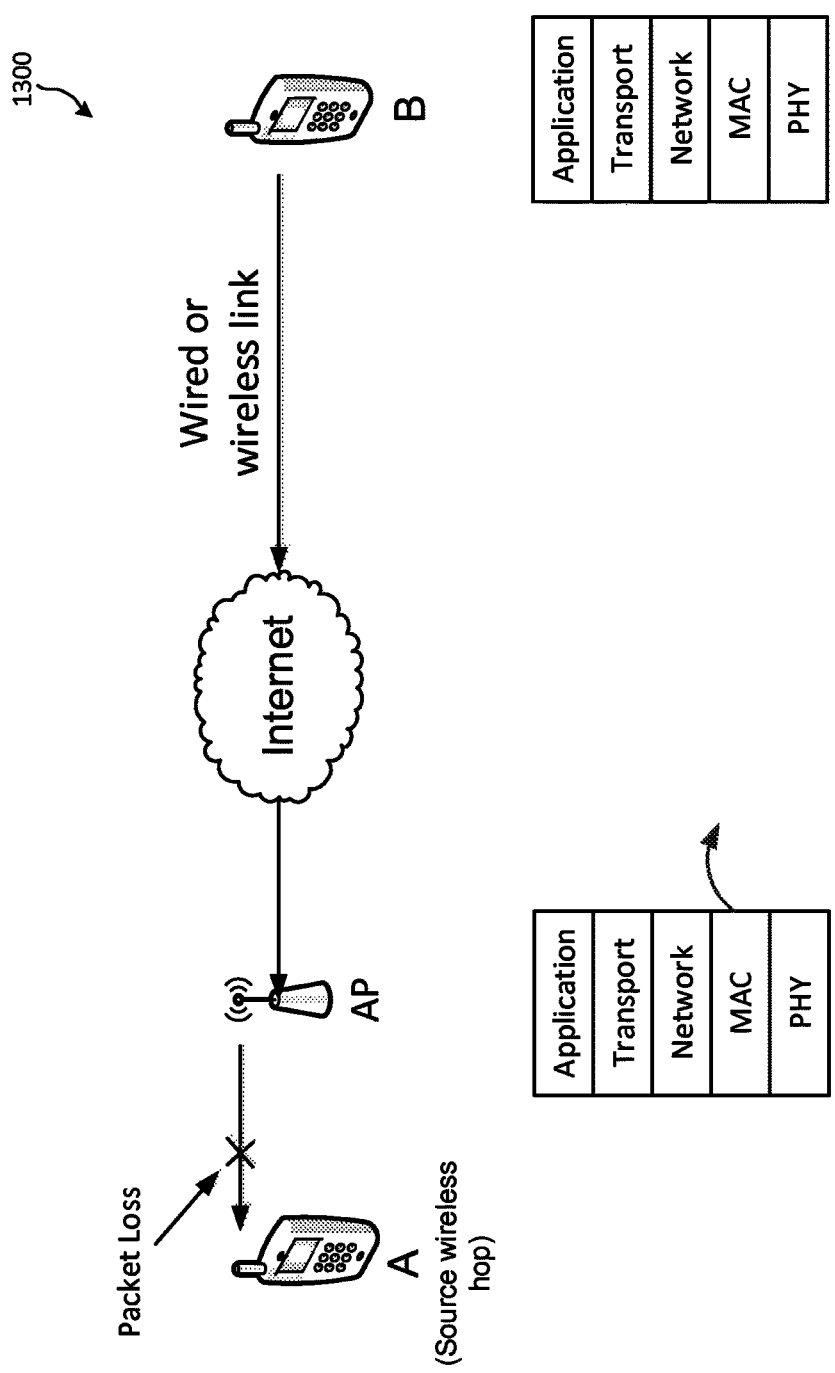
FIG. 13 is a diagram illustrating an example media access control (MAC) layer retransmission in a DL transmission.

FIG. 13 is a diagram illustrating an example MAC layer retransmission in a downlink operation 1300. A sender, such as client B, may send a transmission to a receiver, such as client A, via a wireless link (e.g., via an AP or an eNodeB). A packet may be lost in the transmission, for example, between the access point AP and client A. The access point AP may be configured to detect the lost packet and may retransmit the lost packet at the MAC layer. The access point AP may retransmit the lost packet after retry limit is reached (e.g., 7 retries in IEEE 802.11). The access point AP may retransmit the lost packet with or without a delay. The access point AP may retransmit the lost packet with or without a delay based on the cause of the packet loss (e.g., due to congestion or poor channel quality).

The access point AP may look into the passing RTCP packets to obtain the RTT statistics and/or the RTP delay jitter bound that are sent by the video receiver, for example, if the RTCP packets are not encrypted. The RTP delay jitter bound may comprise a delay (e.g., a maximum additional delay) in excess of a one-way end-to-end delay allowed for an RTP packet to be considered not lost in the network. For example, the RTP packet may be considered lost when an RTP packet takes an amount of time greater than or equal to a sum of the one-way end-to-end delay and the RTP delay jitter bound to travel from a source to a destination. The access point AP may infer the RTT statistics and/or the RTP delay jitter bound, for example, if the RTCP packets are encrypted. For example, if the access point AP may identify a TCP connection between the video source and the video destination, the access point AP may take advantage of the three-way handshake and infer the RTT. Such TCP connections may exist because such applications (e.g., Skype) support text messaging and file transfer in conjunction with video communication, and the text messaging and file transfer are typically carried by TCP.

The access point AP may maintain a database for major real-time video applications (e.g., Skype, Facetime, Google Hangout, etc.). The database may specify a procedure to determine the RTT by exploiting the fixed pattern in the message exchange of an application, and determine the RTP delay jitter bound by exploiting its fixed and application-specific relationship with RTT. The access point AP may identify the application and then apply the procedure to infer the RTT and the RTP delay jitter bound. The access point AP may send an XR packet (e.g., a spoofed XR packet).

Figure 14:
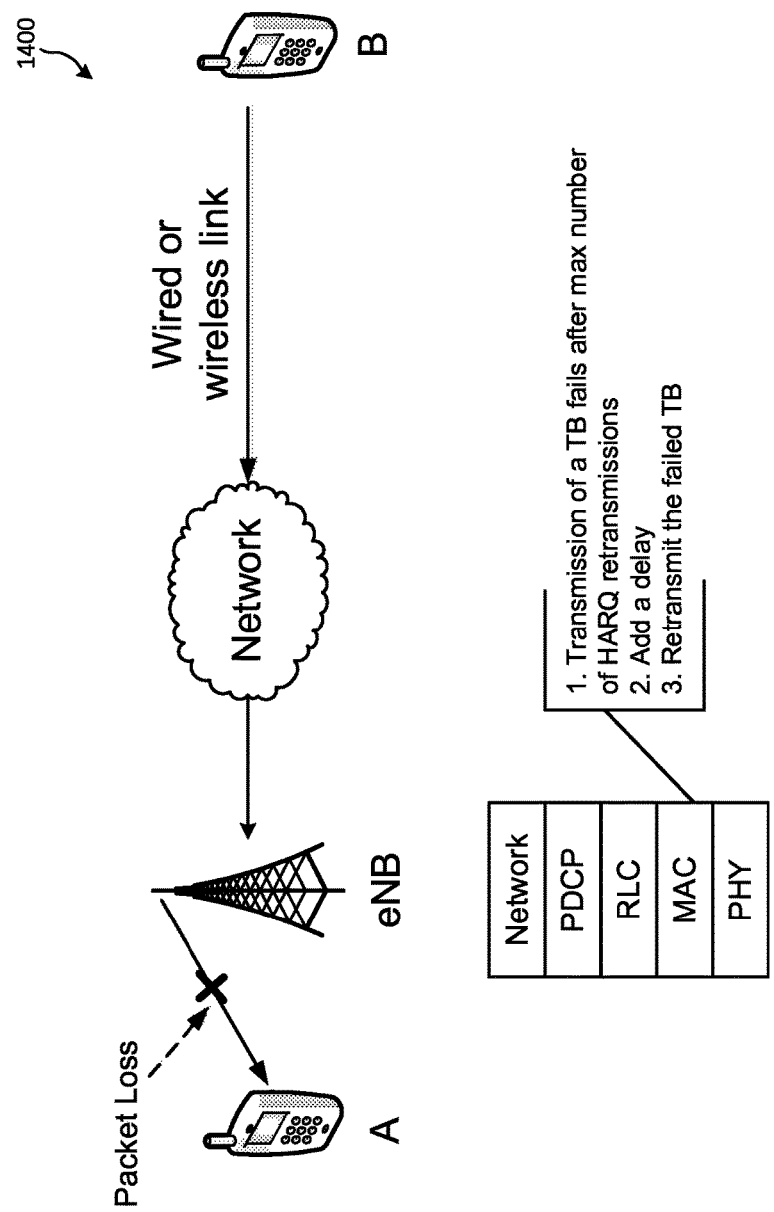
FIG. 14 is a diagram illustrating an example EPLD in a DL transmission in a cellular network.

FIG. 14 is a diagram illustrating an example EPLD in a downlink transmission in a cellular network 1400. Cellular networks may be configured to perform EPLD. A sender, such as client B, may send a transmission to a receiver, such as client A, via a wireless link (e.g., via an AP or an eNodeB). A packet may be lost in the transmission, for example, between the eNB and client A. The eNB may be configured to detect the lost packet.

EPLD may be performed at the MAC layer. A packet loss may be detected if the transmission of a transport block (TB) fails after the maximum number of Hybrid-ARQ (HARQ) attempts at the MAC layer. Once a packet loss is detected, the eNB may send a spoofed NACK to the video sender indicating which RTP packet has been lost. The eNB may perform MAC layer retransmission of the lost packet with a delay (e.g., if the packet loss is due to channel congestion). The eNB may perform MAC layer retransmission of the lost packet without a delay (e.g., if the packet loss is due to channel error).

EPLD may be performed at the RLC layer, for example, if RLC is configured in the acknowledgement mode (AM). A packet loss may be detected if the transmission of a RLC PDU fails at the end of the ARQ process at the RLC layer. The eNB may send a XR report to the video sender indicating which frame been has lost. The eNB may perform RLC layer retransmission of the lost packet with a delay. The eNB may perform RLC layer retransmission of the lost packet without a delay.

Figure 15:
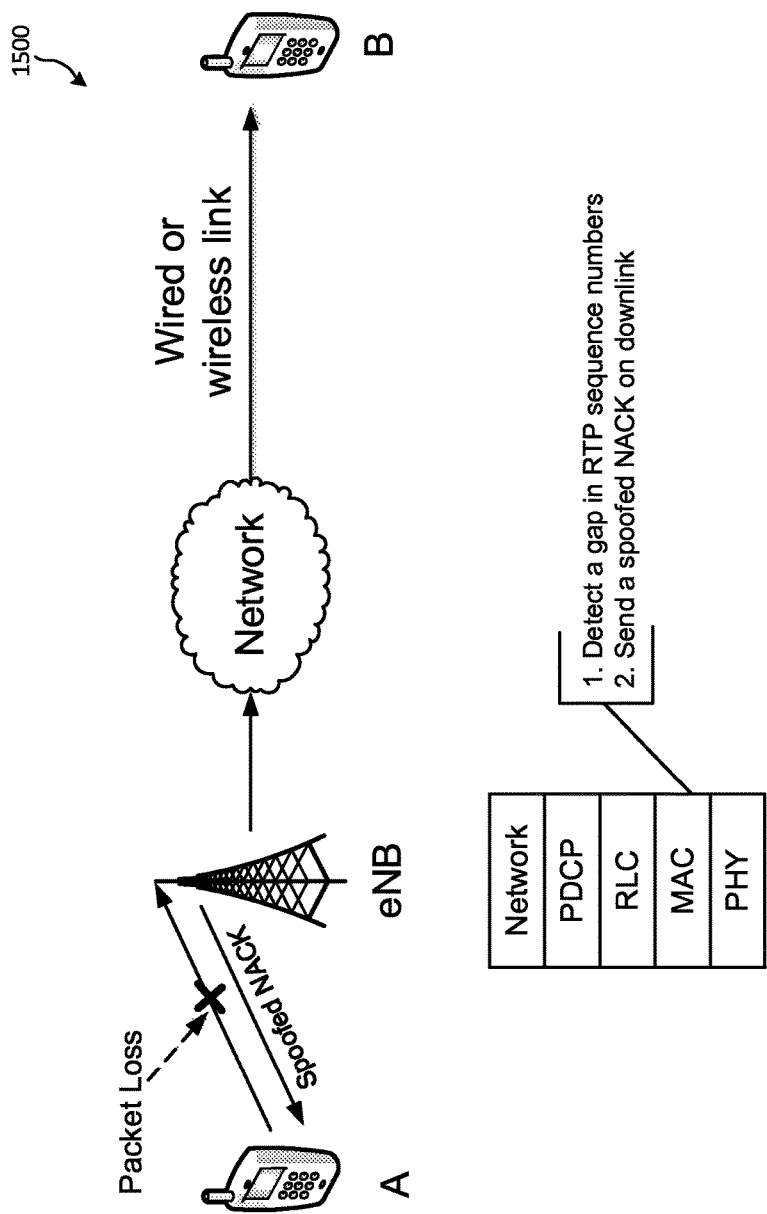
FIG. 15 is a diagram illustrating an example MAC layer retransmission in an uplink (UL) transmission.

FIG. 15 is a diagram illustrating an example MAC layer retransmission in an uplink transmission 1500. Cellular networks may be configured to handle uplink packet losses. A sender, such as client A, may send a transmission to a receiver, such as client B, via a wireless link (e.g., via an AP or an eNodeB). A packet may be lost in the transmission, for example, between the eNB and client A. The eNB may be configured to detect the lost packet. For example, the eNB may infer a packet loss by detecting a gap in the RTP sequence numbers. The eNB may send a spoofed RTCP NACK to client A's WTRU. The eNB may infer a packet loss by detecting a gap in the PDCP sequence numbers. The eNB may send a XR report to client A's WTRU.

The PDCP sequence number of a packet carrying the spoofed NACK or XR may need to be correct, e.g., identified, for example, regardless of whether the gap is detected by the continuity of the RTP sequence numbers or the PDCP sequence numbers. In LTE, each PDCP PDU carries a sequence number. The appearance of a duplicate or out-of-order PDCP PDU may cause problems for the WTRU (e.g., discarding the PDCP PDU). To avoid this, the spoofed NACK or XR (e.g., with various higher layer protocol headers such as UDP and IP) may be carried in a PDCP PDU with an in-sequence PDCP sequence number. For example, an IP packet carrying the NACK or the XR may be injected to the PDCP layer, which may then assign an in-sequence PDCP sequence number. A network device may do the same spoofing if the receiver of the NACK or XR is now the video sender (e.g., and not the sender of the wireless transmission).

Figure 16:
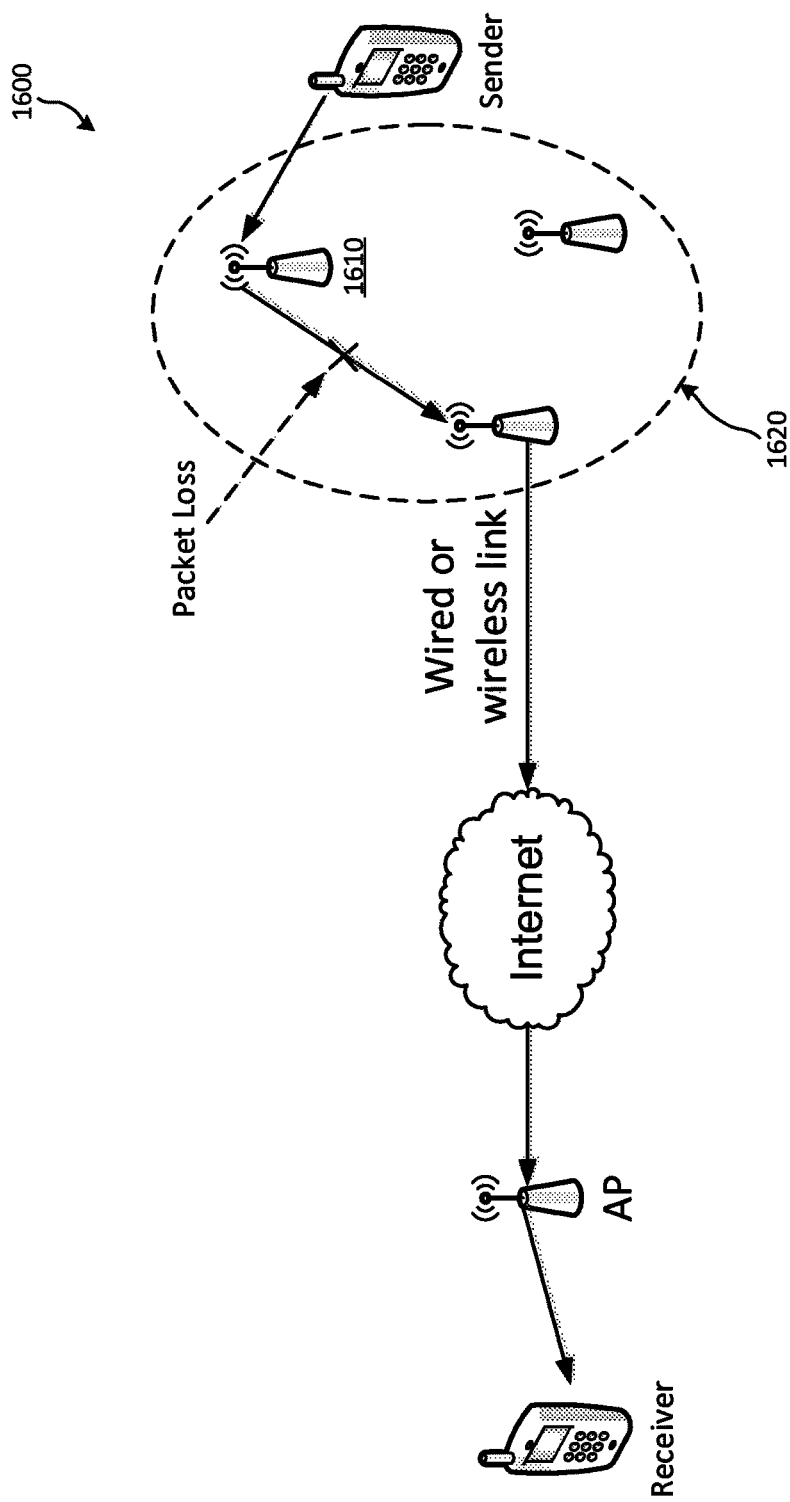
FIG. 16 is a diagram illustrating an example EPLD in network operations.

FIG. 16 is a diagram illustrating an example EPLD in network operations 1600. A network device 1610 in a network operation may detect a packet loss. The network device 1610 (e.g., a wireless router) may be in a wireless mesh network 1620. The network device 1610 may perform EPLD by sending a spoofed NACK packet, sending a spoofed XR packet, or sending a spoofed ACK packet. The network device 1610 may perform MAC layer retransmission. The network device 1610 may send the spoofed packet (e.g., spoofed NACK packet, spoofed XR packet, or spoofed ACK packet) back to the sender. The network device 1610 may perform MAC layer retransmission after reaching its maximum retransmission limit. The MAC layer of a network device may also handle packet losses for TCP.

Figure 17:
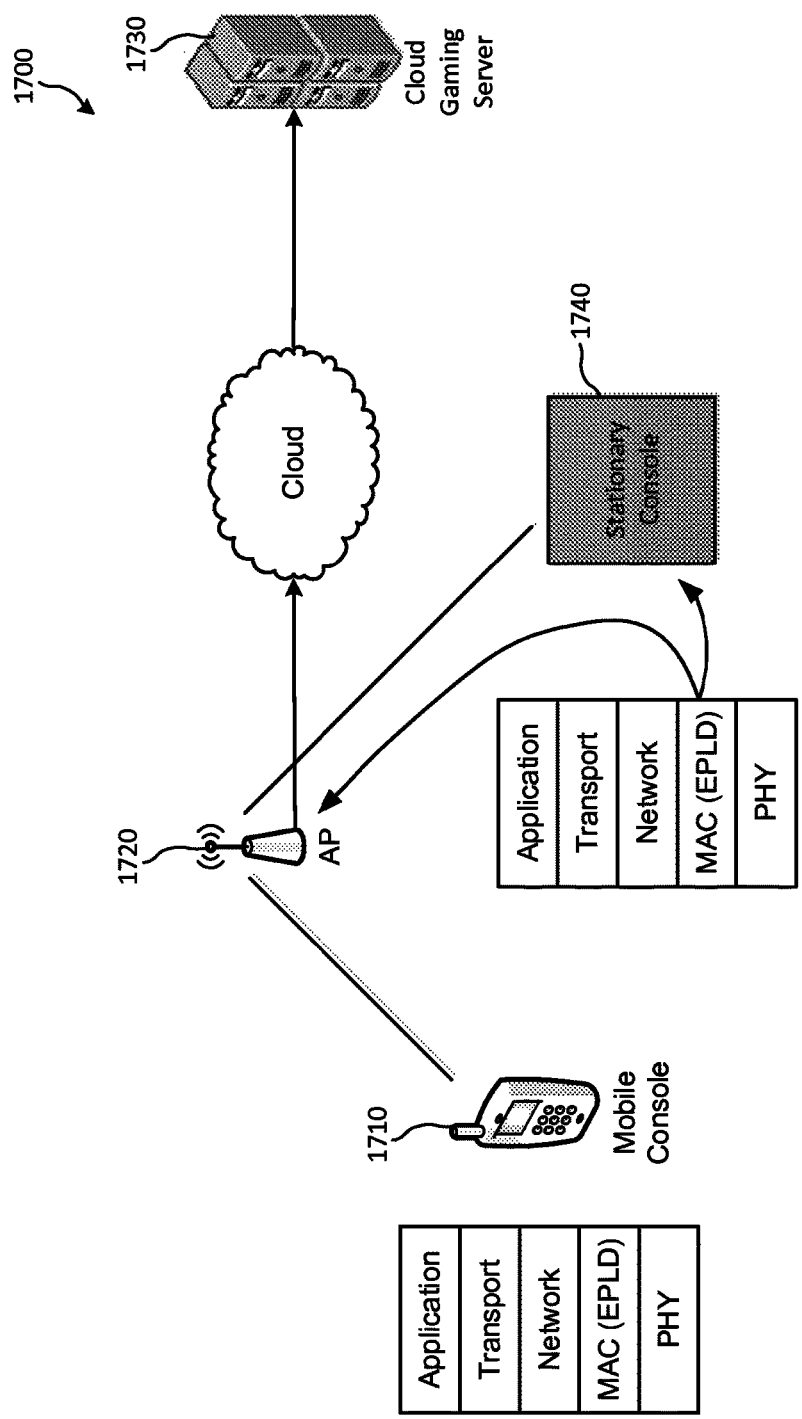
FIG. 17 is a diagram illustrating an example EPLD in cloud video gaming.

FIG. 17 is a diagram illustrating an example EPLD in cloud video gaming 1700. A device in a cloud video gaming application may perform EPLD. A mobile console 1710 may detect packet loss in cloud video gaming applications. Video may be rendered at a server (e.g., a cloud gaming server 1730) and may be sent to the mobile console 1710. The mobile console 1710 may comprise a software application on a smart phone or tablet. The rendered video may be displayed on the mobile console 1710. User actions (e.g., jump, shoot) may be conveyed back to the cloud gaming server 1730 (e.g., in the form of commands). Video rendering may be performed at the mobile console 1710.

An access point 1720 may comprise a stationary console 1740, such that stationary console 1740 may reside between the mobile console 1710 and the cloud gaming server 1730. The stationary console 1740 may comprise a standalone device. The stationary console 1740 may include a protocol stack. The cloud gaming server 1730 may send instructions to the stationary console 1740. The instructions may render all or part of the video to be displayed on the mobile console 1710. The rendered video (e.g., the fully or partially rendered video) may be sent to the mobile console 1710 together with instructions for video rendering (e.g., in the event of partial rendering). User actions may be conveyed back to the stationary console 1740 and/or the cloud gaming server 1730. EPLD may be applied to various wireless transmissions. For example, EPLD may be applied to the transmission of the commands at the mobile console 1710, the forwarding of the commands at the AP 1720, the transmission of the video at the stationary console 1740, and/or the forwarding of the video at the AP 1720.

Video gaming traffic may be differentiated. The video gaming traffic differentiation may be based on priority assigned to various traffic data. The video gaming traffic may include one or more of the following video, audio, instructions, or commands. Performance metrics that may be used with video gaming may include, but are not limited to, interaction latency and video quality. Interaction latency may be defined as how soon the game scene responds after a user invokes the control on the console to select an action. Video quality may be characterized by frame rate, resolution, or the like. Video gaming traffic may be prioritized based on assigned priorities in accessing the channel. For example, instructions and commands may be prioritized over audio and video (e.g., in 802.11). A higher priority traffic class may use a larger predetermined (e.g., maximum) retry limit. A higher priority traffic class may use a shorter arbitration inter-frame spacing (AIFS) (e.g., the delay time before accessing the channel).

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, optical media such as CD-ROM disks, and digital versatile disks (DVDs). A processor in association with software may be used to implement a radio frequency transceiver for use in a WTRU, WTRU, terminal, base station, RNC, or any host computer.

The invention claimed is:

1. A method implemented in a network device for providing packet loss notification in a video transmission, the method comprising:
    determining that a first video packet sent from a first client device to a second client device has been lost, the network device located between the first client device and the second client device, the first video packet comprising video data addressed to the second client device;
    determining network identity information associated with the first client device;
    determining, based at least in part on the network identity information associated with the first client device and prior to receiving reporting from the second client device regarding the loss of the first video packet, that a second video packet comprising video data is addressed to the first client device;
    modifying the second video packet by adding packet loss information indicating that the first video packet has been lost; and
    sending the modified second video packet to the first client device.

2. The method of claim 1, wherein the packet loss information comprises a real-time transport protocol (RTP) sequence number of the first video packet.

3. The method of claim 1, wherein modifying the second video packet comprises adding the packet loss information to at least one of an internet protocol (IP) options field or a real-time transport protocol (RTP) extension header of the second video packet.

4. The method of claim 1, wherein determining that the second video packet is addressed to the first client device comprises determining that the second video packet includes a destination port number that matches a video packet receiving port number of the first client device.

5. The method of claim 1, wherein the network identity information associated with the first client device comprises a video packet receiving port number of the first client device.

6. The method of claim 5, wherein the network identity information associated with the first client device is included in the first video packet.

7. The method of claim 5, wherein the video packet receiving port number of the first client device is determined based on an indication in at least one of an internet protocol (IP) options field or a real-time transport protocol (RTP) extension header of the first video packet.

8. The method of claim 1, wherein the video transmission is associated with a video call between the first client device and the second client device.

9. The method of claim 1, wherein the video transmission is associated with a video conference among three or more client devices.

10. The method of claim 1, wherein the network device is a router, an access point, or an eNodeB.

11. The method of claim 1, further comprising receiving, at the network device, the first video packet sent from the first client device to the second client device.

12. The method of claim 1, further comprising receiving, at the network device, the first video packet sent from the first client device to the second client device, and wherein determining that the first video packet has been lost comprises dropping the first video packet.

13. The method of claim 1, further comprising:
    determining that the modified second video packet has been lost;
    receiving a third video packet sent from the second client device to the first client device, the third video packet comprising video data addressed to the first client device;
    modifying the third video packet by adding the packet loss information indicating that the first video packet has been lost; and
    sending the modified third video packet to the first client device.

14. The method of claim 1, further comprising implementing one or more piggybacking rules received from a software defined network (SDN) controller.

15. The method of claim 1, wherein the packet loss information indicates congestion.

16. A network device comprising:
    a processor configured to:
    determine that a first video packet sent from a first client device to a second client device has been lost, the network device located between the first client device and the second client device, the first video packet comprising video data addressed to the second client device;
    determine network identity information associated with the first client device;
    determine, based at least in part on the network identity information associated with the first client device and prior to receiving reporting from the second client device regarding the loss of the first video packet, that a second video packet comprising video data is addressed to the first client device;
    modify the second video packet by adding packet loss information that indicates that the first video packet has been lost; and
    send the modified second video packet to the first client device.

17. The network device of claim 16, wherein the packet loss information comprises a real-time transport protocol (RTP) sequence number of the first video packet.

18. The network device of claim 16, wherein the processor configured to modify the second video packet comprises the processor further configured to add the packet loss information to at least one of an internet protocol (IP) options field or a real-time transport protocol (RTP) extension header of the second video packet.

19. The network device of claim 16, wherein the processor being configured to determine that the second video packet is addressed to the first client device comprises the processor being configured to determine that the second video packet includes a destination port number that matches a video packet receiving port number of the first client device.

20. The network device of claim 16, wherein the network identity information associated with the first client device comprises a video packet receiving port number of the first client device.

21. The network device of claim 20, wherein the video packet receiving port number of the first client device is included in the first video packet.

22. The network device of claim 20, wherein the video packet receiving port number of the first client device is determined based on an indication in at least one of an internet protocol (IP) options field or a real-time transport protocol (RTP) extension header of the first video packet.

23. The network device of claim 16, wherein the video transmission is associated with a video call between the first client device and the second client device.

24. The network device of claim 16, wherein the video transmission is associated with a video conference among three or more client devices.

25. The network device of claim 16, wherein the network device is a router, an access point, or an eNodeB.

26. The network device of claim 16, wherein the processor is further configured to receive the first video packet sent from the first client device to the second client device.

27. The network device of claim 16, wherein the processor is further configured to receive the first video packet sent from the first client device to the second client device, and wherein the processor being configured to determine that the first video packet has been lost comprises the processor determining to drop the first video packet.

28. The network device of claim 16, wherein the processor is further configured to:
  determine that the modified second video packet has been lost;
  receive a third video packet sent from the second client device to the first client device, the third video packet comprising video data addressed to the first client device;
  modify the third video packet by adding the packet loss information indicating that the first video packet has been lost; and
  send the modified third video packet to the first client device.

29. The network device of claim 16, wherein the processor is further configured to implement one or more piggybacking rules received from a software defined network (SDN) controller.

30. The network device of claim 16, wherein the packet loss information indicates congestion.

\* \* \* \* \*